United States Patent
Cabrol et al.

(10) Patent No.: US 12,218,714 B2
(45) Date of Patent: Feb. 4, 2025

(54) COMMUNICATION IN A RESONANCE MAGNETIC COUPLED SYSTEM

(71) Applicant: DRNC HOLDINGS, INC., Wilmington, DE (US)

(72) Inventors: Patrick Cabrol, Bayshore, NY (US); Tanbir Haque, Jackson Heights, NY (US); Ravikumar Pragada, Warrington, PA (US); Marian Rudolf, Montreal (CA); Anantharaman Balasubramanian, San Diego, CA (US); Hussain Elkotby, Conshohocken, PA (US)

(73) Assignee: DRNC HOLDINGS, INC., Wilmington, DE (US)

( * ) Notice: Subject to any disclaimer, the term of this patent is extended or adjusted under 35 U.S.C. 154(b) by 519 days.

(21) Appl. No.: 17/312,130

(22) PCT Filed: Dec. 17, 2019

(86) PCT No.: PCT/US2019/066815
§ 371 (c)(1),
(2) Date: Jun. 9, 2021

(87) PCT Pub. No.: WO2020/131854
PCT Pub. Date: Jun. 25, 2020

(65) Prior Publication Data
US 2022/0038136 A1 Feb. 3, 2022

Related U.S. Application Data

(60) Provisional application No. 62/780,389, filed on Dec. 17, 2018, provisional application No. 62/886,135, filed on Aug. 13, 2019.

(51) Int. Cl.
*H04B 5/72* (2024.01)
*H04B 1/69* (2011.01)
(Continued)

(52) U.S. Cl.
CPC .................. *H04B 5/72* (2024.01); *H04B 1/69* (2013.01); *H04B 5/48* (2024.01); *H04B 17/336* (2015.01)

(58) Field of Classification Search
CPC .......... H04B 1/69; H04B 5/0031; H04B 5/02; H04B 17/336
See application file for complete search history.

(56) References Cited

U.S. PATENT DOCUMENTS

| | | | |
|---|---|---|---|
| 6,269,092 B1 | 7/2001 | Schilling | |
| 8,675,711 B1 | 3/2014 | McDermott et al. | |
| (Continued) | | | |

FOREIGN PATENT DOCUMENTS

| | | |
|---|---|---|
| CN | 1701550 | 11/2005 |
| CN | 103039120 | 4/2013 |
| KR | 2011007458 | 6/2011 |

OTHER PUBLICATIONS

Ahn et al., "A Study on Magnetic Field Repeater in Wireless Power Transfer", IEEE Transactions on Industrial Electronics, vol. 60, No. 1, Jan. 2013, pp. 360-371.
(Continued)

*Primary Examiner* — David B Lugo
(74) *Attorney, Agent, or Firm* — Chris Kolefas

(57) ABSTRACT

A resonance magnetic coupling (RMC) communication may be enabled between devices. A device may use a discovery mechanism to transmit and exchange information. A device may use the discovery mechanism to establish a RMC communication channel and may determine its parameterization. A device using a RMC communication may transmit a discovery signal to determine channelization and/or properties of the RMC link. The discovery signal may be generated in the form of a beacon transmission. A signal sequence may be employed for a discovery signal. A device using a RMC communication may transmit a sequence of
(Continued)

beacon or discovery signals to track characteristics of the RMC link. Beacon scheduling may be used for RMC communications, and the communication channel may not be static and may be a function of distance and orientation. A device using a RMC communication may sense the channel for potential beacon or sequence signals from other devices.

16 Claims, 20 Drawing Sheets

(51) Int. Cl.
  *H04B 5/48* (2024.01)
  *H04B 17/336* (2015.01)

(56) References Cited

U.S. PATENT DOCUMENTS

| | | | |
|---|---|---|---|
| 10,656,258 B2* | 5/2020 | Lee | G01S 13/003 |
| 2008/0123766 A1* | 5/2008 | Kwon | H04L 5/0041 |
| | | | 375/267 |
| 2009/0156227 A1 | 6/2009 | Frerking et al. | |
| 2014/0056220 A1 | 2/2014 | Poitau et al. | |
| 2014/0071931 A1 | 3/2014 | Lee et al. | |
| 2015/0243432 A1* | 8/2015 | Laifenfeld | G01R 35/005 |
| | | | 324/601 |
| 2016/0291163 A1* | 10/2016 | Wallace | G01S 1/0428 |
| 2017/0317739 A1* | 11/2017 | Emmanuel | H04W 72/541 |

OTHER PUBLICATIONS

Karalis et al., "Efficient Wireless Non-Radiative Mid-Range Energy Transfer", Annals of Physics, vol. 323, No. 1, Jan. 2008, pp. 1-19.
Kurs et al., "Wireless Power Transfer via Strongly Coupled Magnetic Resonances", Science, vol. 317, No. 5834, Jul. 6, 2007, pp. 83-86.
Lin, James C., "A New IEEE Standard for Safety Levels with Respect to Human Exposure to Radio-Frequency Radiation", IEEE Antennas and Propagation Magazine, vol. 48, No. 1, Feb. 2006, pp. 157-159.
Mongia, R., "RF and Microwave Coupled-Line Circuits", City: Artech House Publishers, 2007.
Nair et al., "An Efficiency Enhancement Technique for a Wireless Power Transmission System Based on a Multiple Coil Switching Technique", Energies, vol. 9, No. 156, 2016, pp. 1-15.
Sample et al., "Analysis, Experimental Results, and Range Adaptation of Magnetically Coupled Resonators for Wireless Power Transfer", IEEE Transactions on Industrial Electronics, vol. 58, No. 2, Feb. 2011, pp. 544-554.
Zhang et al., "Analysis and Optimization of Three-Resonator Wireless Power Transfer System for Predetermined-Goals Wireless Power Transmission", Energies, vol. 9, No. 274, 2016, pp. 1-20.
Choma et al., Feedback Networks: Theory and Circuit Applications, City: World Scientific Publishing Company, Advanced Series in Circuits and Systems, vol. 5, excerpted from the reference textbook covering section 3.3.0 to 3.3.5, 2007, 10 pages.

* cited by examiner

COMMUNICATION IN A RESONANCE MAGNETIC COUPLED SYSTEM

CROSS REFERENCE

This application is the National Stage Entry under 35 U.S.C. § 371 of Patent Cooperation Treaty Application No. PCT/US2019/066815, filed Dec. 17, 2019, which claims the benefit of U.S. Provisional Application No. 62/780,389, filed on Dec. 17, 2018 and U.S. Provisional Application No. 62/886,135, filed on Aug. 13, 2019, the contents of which are incorporated by reference herein.

BACKGROUND

Wireless power transfer (WPT) may be applied to portable electronic devices and may apply in commercial applications, such as smartphones, medical instruments, electric vehicles (EVs), wireless sensors, internet of things (IoT) devices, and/or the like.

SUMMARY

A resonance magnetic coupling (RMC) communication may be enabled between devices. For example, to enable RMC communication between devices, a discovery mechanism may be used for devices to transmit and exchange information. A device may use the discovery mechanism to establish a RMC communication channel and may determine parameterization of the device. For example, a device may include a wireless transmit/receive unit (WTRU).

Systems, methods, and instrumentalities for a device using RMC communication are provided. A device, such as a WTRU may transmit a discovery signal to determine channelization and/or properties of an RMC link. The discovery signal may be generated in the form of a beacon transmission. A signal sequence may be employed for a discovery signal.

A first device, e.g., a first WTRU used as an example herein, may transmit a spread spectrum signal, such as a discovery signal, in a bandwidth (e.g., in/across the bandwidth). The transmitting of the spread spectrum signal in the bandwidth may be an initial transmission. The bandwidth may span across a full specified spectrum. The bandwidth may be unsplit (e.g., unbisected).

The first device may listen for a response. The response may be in a form of a reflected signal. The response may be from a second device, e.g., a second WTRU used as an example herein. The first device may determine whether a signal-to-noise-ratio (SNR) value associated with the response from the second device is above or below a threshold. The response from the second device may be in the bandwidth (e.g., the bandwidth of the transmitted spread spectrum signal).

If the first device determines that the SNR value associated with the response is below the threshold, the first device may make subsequent transmission(s) where one or more of the following may be performed. The first device may split the bandwidth (e.g., the bandwidth associated with the initial transmission) into sub-bands. The first device may split the bandwidth into two sub-bands, e.g., a first sub-band and a second sub-band. The sub-bands may span a same or different length. In examples, the first device may bisect the bandwidth to two sub-bands, where the first sub-band and the second sub-band may each span a different half of the spectrum of the bandwidth associated with the initial transmission.

The first device may transmit the spread spectrum signal in each of the sub-bands. For example, the first device may transmit the spread spectrum signal in the first sub-band and transmit the spread spectrum signal in the second sub-band (e.g., separately). A power level associated with each sub-band transmission is approximately the same (e.g., equal to) a power level associated with the initial transmission. A power level associated with either the first sub-band or the second sub-band is approximately twice as much as the power level associated with the same portion of bandwidth associated with the initial transmission.

The first device may determine whether an SNR value associated with a response in a sub-band is above or below the threshold. For example, the first device may determine whether an SNR value associated with a response in either the first sub-band or the second sub-band is above or below the threshold.

If the first device determines that the SNR value associated with the response in the sub-band (e.g., either the first sub-band or the second sub-band) is above the threshold, the first device may determine, from the response in the sub-band, a parameter associated with the second device. The parameter may include one or more of an ID associated with the second device, a loop-to-coil coupling coefficient associated with the first device, a loop-to-coil coupling coefficient associated with the second device, a frequency in the determined channel, and/or a gain. The first device may determine a channel in the sub-band based on the parameter. The first device may establish a link between the devices (e.g., between the first device and the second device) based on the determined channel. The first device may send an acknowledgement message to the second device based on establishing the link.

The first device may monitor the link between the devices (e.g., between the first device and the second device). For example, the first device may determine whether the link between the devices (e.g., the first device and the second device) is above or below a quality threshold. If the first device determines that the channel is below the quality threshold, the first device may adjust the channel in the sub-band or adjust the parameter, such as the loop-to-coil coupling coefficient. If the first device determines that the channel is above the quality threshold, the first device may continue to monitor the link, e.g., the link between the first device and the second device.

If the first device determines that the SNR value in the sub-band (e.g., either the first sub-band or the second sub-band) is below the threshold, the first device may split each of the sub-band into two sub-bands. The first device may split the first sub-band into two sub-bands, e.g., a third sub-band and a fourth sub-band, and the first device may split the second sub-band into two sub-bands, e.g., a fifth sub-band, and a sixth sub-band. The sub-bands (e.g., the third, the fourth, the fifth, and/or the sixth sub-band) may span a same or different length as described herein. For example, the first device may bisect the first and/or the second sub-bands to two sub-bands, where the third sub-band and the fourth sub-band and/or the fifth sub-band and the sixth sub-band may each span a different half of the spectrum of the bandwidth associated with the first and the second sub-bands, respectively.

The first device may transmit the spread spectrum signal in each of the sub-bands (e.g., in the third sub-band, the fourth sub-band, the fifth sub-band, and the sixth sub-band). The first device may determine whether an SNR value associated with a response in further split sub-bands (e.g., either the third sub-band, the fourth sub-band, the fifth sub-band, or the sixth sub-band) is above or below the threshold. The first device may continue to split the sub-bands (e.g., bisect sub-bands such as the third sub-band, the fourth sub-band, the fifth sub-band, and the sixth sub-band) and determine an SNR value associated with a response if the response in the further split sub-bands is below the threshold. The first device may establish, monitor, and/or adjust the link between the devices (e.g., the first device and the second device) if the response in the further split sub-bands is above the threshold.

The first device may determine that no response has been received if the SNR value associated with the response in the bandwidth, sub-band, or split sub-band is equal to zero.

If the first device determines that the SNR value associated with the response in the bandwidth (e.g., the initially transmitted bandwidth) is above the threshold, the first device may determine, from the response in the bandwidth, the parameter associated with the second device. The first device may determine a channel that is in the bandwidth based on the parameter. The first device may establish a link between the devices (e.g., the first device and the second device) based on the determined channel.

One or more discovery beacons and sequence structures may be used for signaling in a RMC communication system. For example, one or more of the following may be used for signaling in RMC communication systems: pseudo-random sequences; chirp sequences; and/or continuous wave (CW) or a radio frequency (RF) tone.

A first device using RMC communication may transmit a sequence of beacon or discovery signals to track characteristics of the RMC link. Beacon scheduling may be used for RMC communications, and the communication channel may vary (e.g., not static) and may be a function of distance and orientation.

A device (e.g., a first WTRU) using RMC communication may sense the channel for potential beacon or sequence signals from one or more other devices. The first device may use a sensed signal to determine characteristics of the RMC link and/or to derive transmission and/or reception settings.

A first device associated with RMC communication may use frequency-splitting, adaptive frequency tuning, and/or impedance adjustment, e.g., to manage a RMC link.

Devices, such as those disclosed herein, e.g., the first device and the second device, may use beacon sequences and exploit the waveform characteristics, e.g., in order to determine and adjust an operating point for RMC communication.

Discovery mechanisms (e.g., associated with RMC communication) may include a wideband-narrowband mechanism, a search mechanism, and/or a random scanning mechanism.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
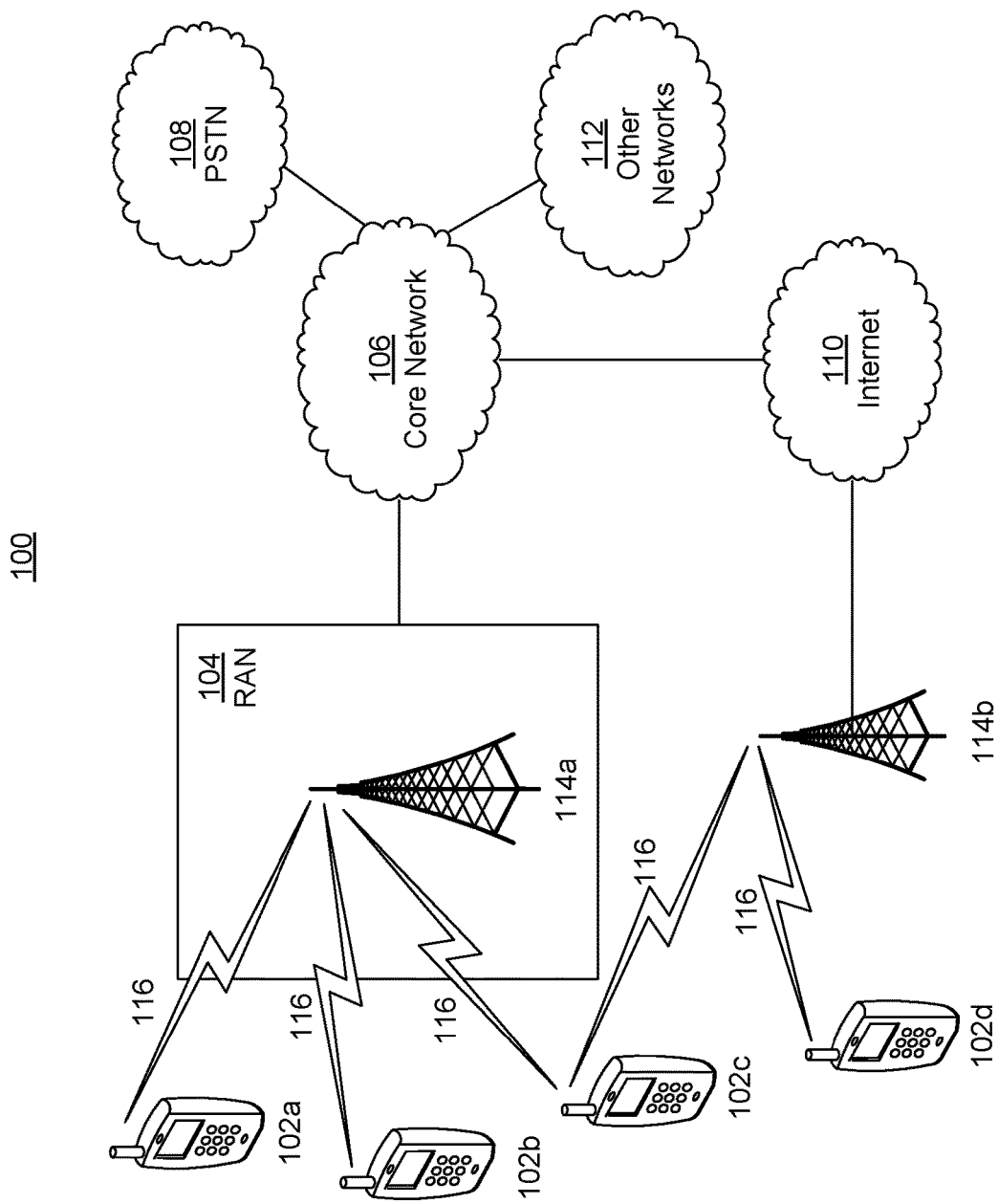
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, resonance-magnetic coupling, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
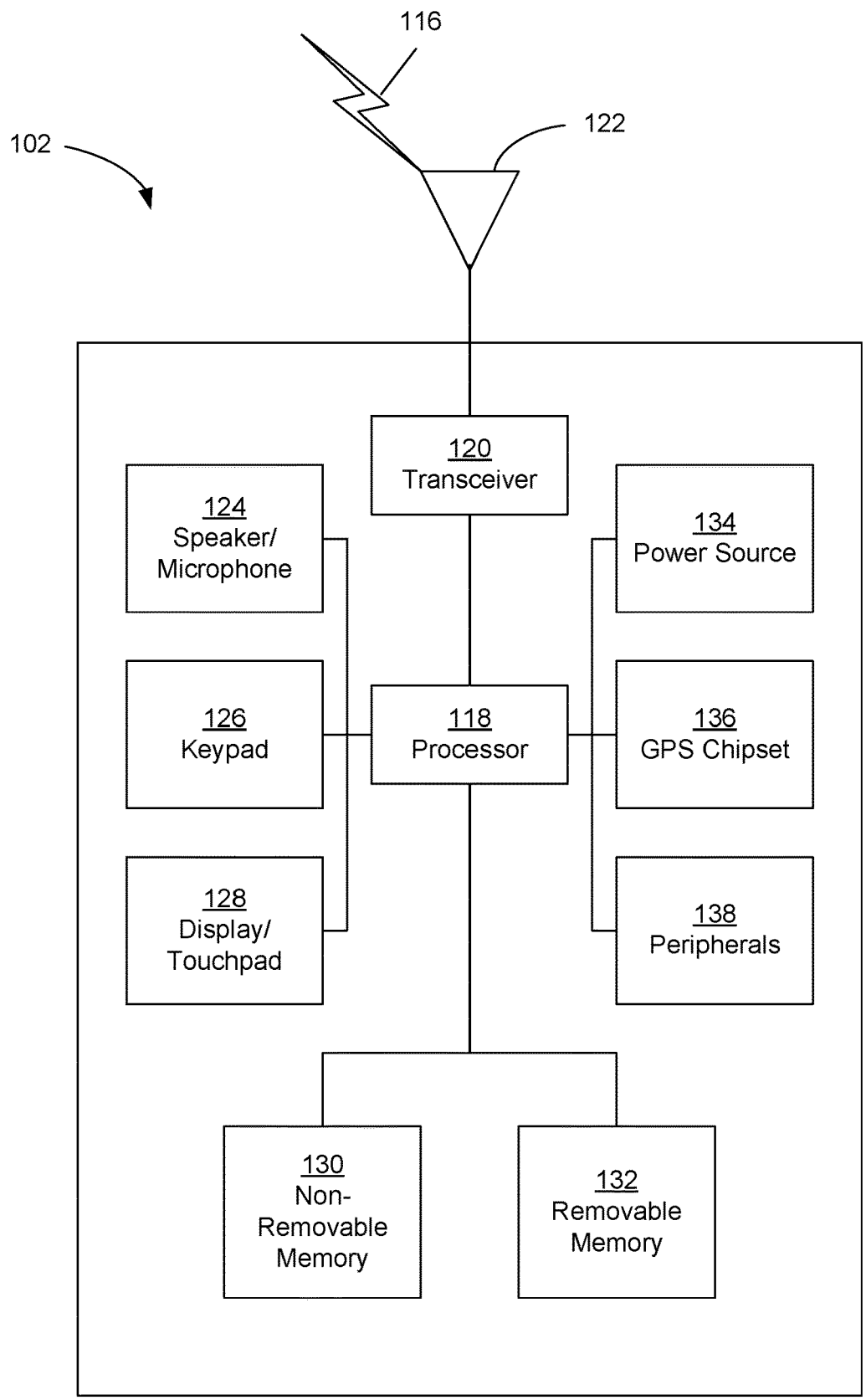
FIG. 1B is a system diagram illustrating an example wireless transmit/receive unit (WTRU) that may be used within the communications system illustrated in FIG. 1A according to an embodiment.
Figure 1C:
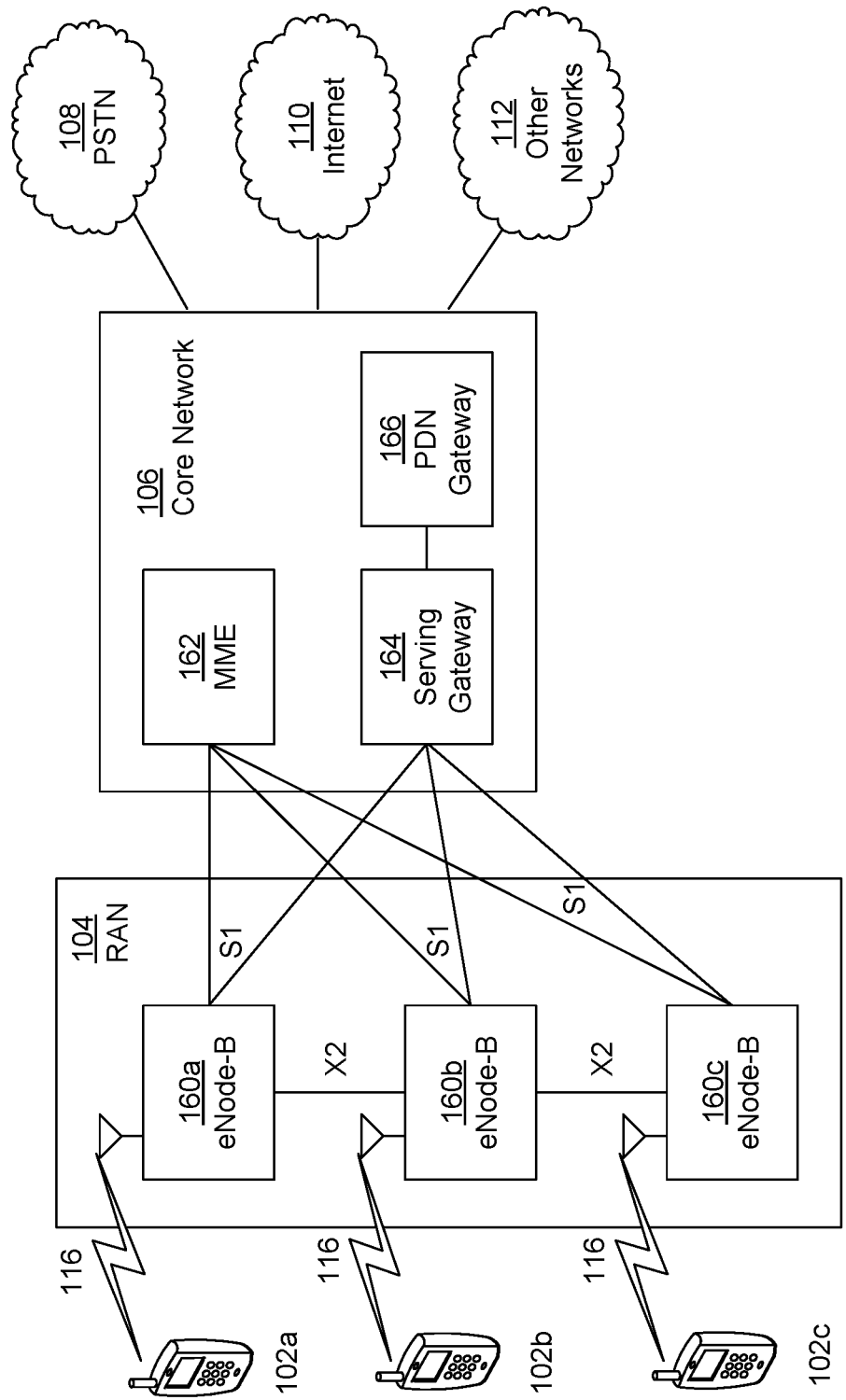
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In examples, the transmit/receive element 122 may be an emitter/detector to transmit and/or receive signals using resonance magnetic coupling. In yet another embodiment, the transmit/receive element 122 may be configured to transmit and/or receive both RF and light or resonance magnetic coupling signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless or resonance-magnetic coupling signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
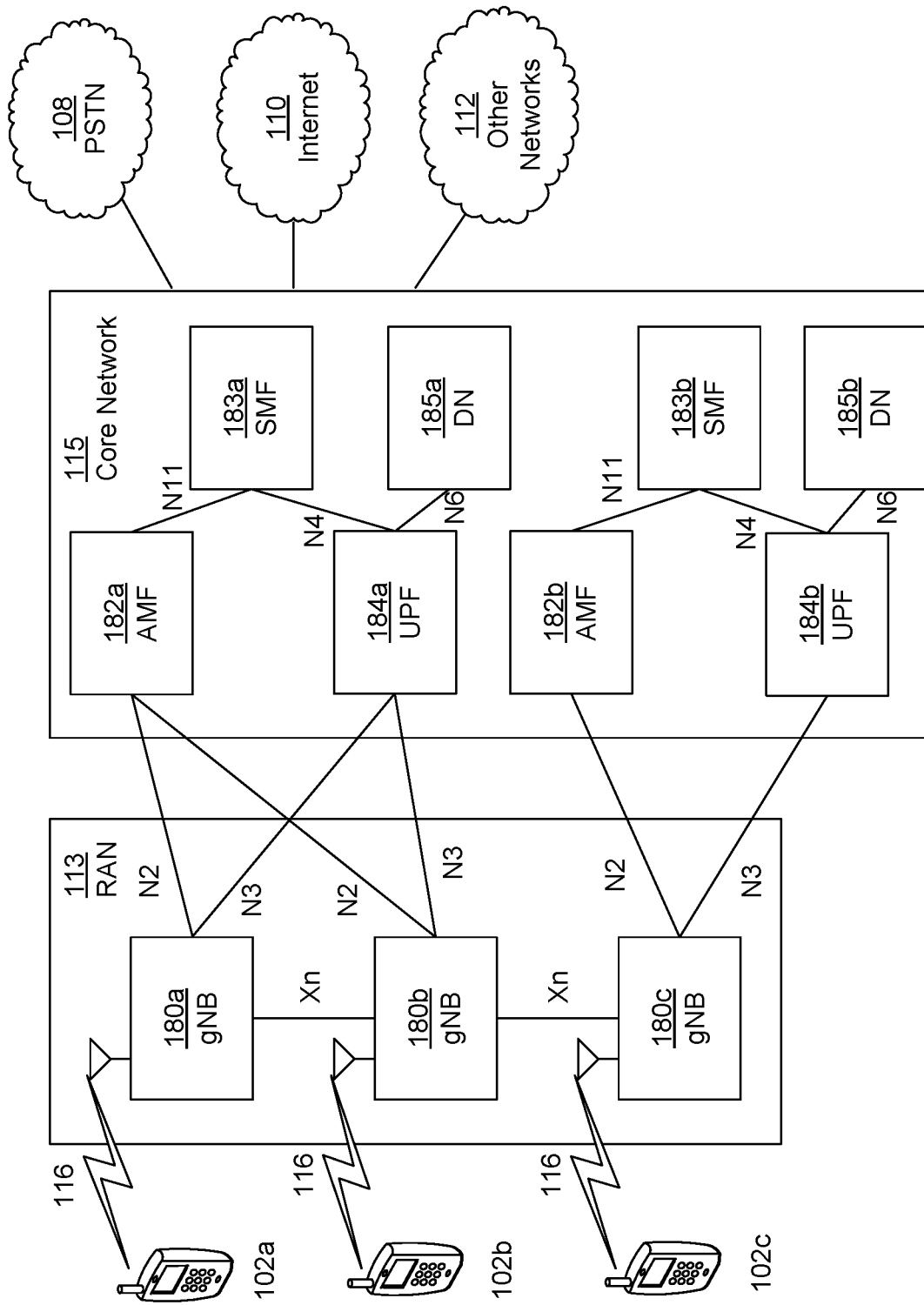
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Radiative energy transfer may have been used for transferring information. Using radiative energy transfer for transferring information may be difficult for power transfer applications, such as low efficiency of power transfer for omnidirectional radiation patterns, unidirectional radiation requiring line of sight, and/or tracking mechanisms to accommodate mobility.

Power delivery at mid-field approach may be efficient. For example, power delivery at mid-field approach may have higher efficiency than far-field approaches. Power delivery at mid-field approach may work at longer distances, e.g., longer distances then inductive coupled systems. Efficiency of the power delivery may fall-off (e.g., rapidly) if a receiving device is relocated away from (e.g., optimal) operating coordinates.

Resonant objects may be coupled through nonradiative fields for midrange energy transfer. For example, two resonant objects that are tuned at the same resonant frequency may exchange energy efficiently. Common materials may not interact with magnetic fields, and magnetic resonance systems described herein may be suitable for everyday applications.

Wireless power transfer (WPT) classifications may include far-field transmission and near-field transmission. Far-field transmission may be implemented with radio frequency (RF) and/or microwave circuits. Far-field transmission may be for low-power applications, e.g., where transmission efficiency may not be critical. Far-field transmission may be unsuitable for high power transmission in public settings, e.g., due to safety concerns for human exposure.

Figure 2:
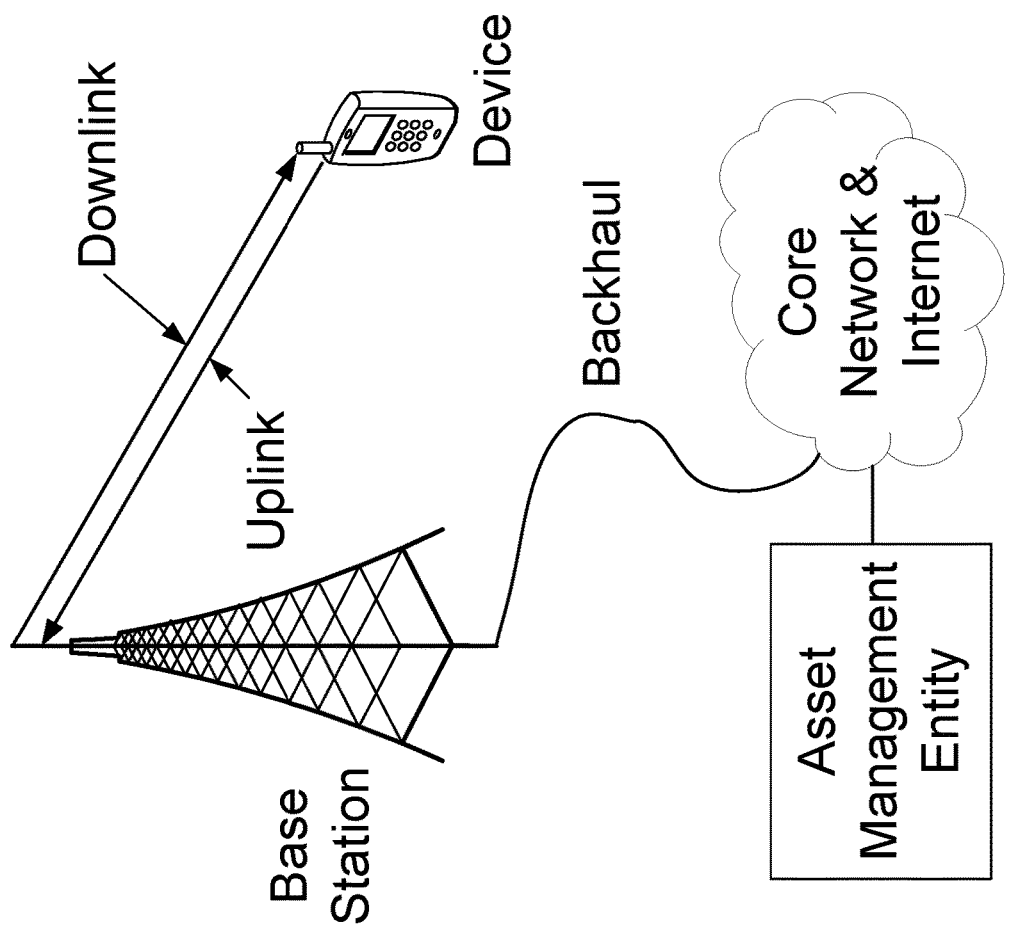
FIG. 2 illustrates an example network architecture.

FIG. 2 illustrates an example network architecture. WPT described herein may use a network shown in FIG. 2 for its transmission.

Near field transmissions may be more efficient with safer levels of radiofrequency exposure. Inductive power transfer (IPT) and capacitive power transfer (CPT) may be examples of near-field WPT technologies. Near-field transmission may include sub-groups, such as short-range and mid-range transmissions. For short-range near-field WPT, the transmitter and receiver may be at a distance of a few centimeters based on the two-coil approach. For example, the two-coil approach may be similar to or same as an air core transformer, where magnetic materials may be absent between the primary and secondary windings.

For greater distances between transmitter and receiver coils in the mid-range near-field transmission, less magnetic flux linkage may be captured by the receiver coil. Intermediate resonators with the same resonant frequency at the transmitter coil and the receiver coil may be inserted and may achieve wide air-gap power transmission. Two resonant objects of the same resonant frequency may exchange energy efficiently, while energy (e.g., relatively little energy) may be dissipated in external and/or surrounding off-resonant objects. Midrange power transfer, e.g., as implemented described herein, may be nearly omnidirectional and/or efficient, e.g., irrespective of the geometry of the surrounding space and/or with low interference and losses into environmental objects.

Wirelessly transferring energy across a short distance may use inductive power transmission. Inductive power transmission using a pair of mutually coupled coils may be used for a broad range of applications (e.g., designed to cut power cords in charging mobile electronic devices, operating small home appliances, and/or the like). Wireless power transmission efficiency (PTE) in inductive links, e.g., particularly at larger coupling distances, may be provided or improved without increasing the size and/or weight of the coupled coils.

A device (e.g., when charging) may communicate with a charger to identify and/or specify charge requirements (e.g., link quality, efficiency, safety limits, and/or the like), e.g., to limit human tissue exposure to alternating current (AC) magnetic field. The communication may be established over Wi-Fi or other similar RF links. For the communication between a charger and a device (e.g., during charging), a separate RF transceiver may be included.

Figure 3:
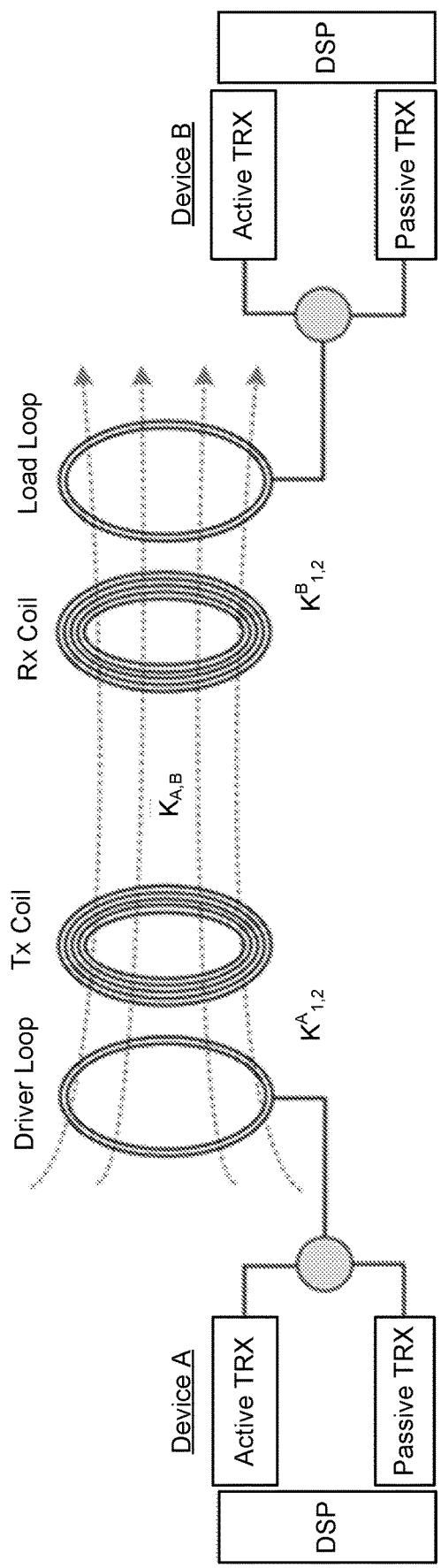
FIG. 3 illustrates an example resonance magnetic communication link in a resonance magnetic system.

A resonance magnetic coupled system may include a resonance magnetic WPT and/or communication system. For example, FIG. 3 illustrates an example resonance magnetic communication link in a resonance magnetic system. A drive loop (e.g., a single turn drive loop) coupled to a multi-turn spiral coil may include a transmit antenna. If a transmitter (TRX) amplifier powers the drive loop, the resulting oscillating magnetic field may excite the Tx coil. The Tx coil may store energy in the same manner as a discrete resonant (LC) tank. The receiver side (e.g., Rx coil) may function in a similar or same manner. The Tx coil and Rx coil may interact with each other. The Tx coil and Rx coil may be or may act as a high-Q RLC tank resonator. The loop and coils may be magnetically coupled. The transmit and receive coils may share a mutual inductance that may be a function of the geometry of the coils and the distance between the transmit and receive coils.

When driving a wireless power system with an RF source and using a load resistor on a receiver to extract work (e.g., power) from the system, the amount of coupling may define how much energy is transferred per cycle. A distance (e.g., a coupling point) may exist where beyond which the system may not drive a given load at a desired efficiency (e.g., a maximum efficiency). An analytic model of the magnetically coupled resonator system may be described herein. System parameters may be derived. Adaptive tuning techniques may be used to achieve near constant efficiency versus distance.

Electric circuit theory (ECT) may be an example tool to design and analyze WPT systems. For an exemplary resonant magnetic circuit model shown in FIG. 4, the current in a resonant circuit may be determined using Kirchhoff's voltage law (e.g., equations (1)-(4)):

$$I_1\left(R_S + R_{p1} + j\omega L_1 + \frac{1}{j\omega C_1}\right) + j\omega I_2 M_{12} = V_s \tag{1}$$

$$I_2\left(R_{p2} + j\omega L_2 + \frac{1}{j\omega C_2}\right) + j\omega(I_2 M_{12} - I_3 M_{23}) = 0 \tag{2}$$

$$I_3\left(R_{p3} + j\omega L_3 + \frac{1}{j\omega C_3}\right) + j\omega(I_4 M_{34} - I_2 M_{23}) = 0 \tag{3}$$

$$I_4\left(R_L + R_{p4} + j\omega L_4 + \frac{1}{j\omega C_4}\right) + j\omega I_3 M_{34} = 0 \tag{4}$$

The coupling coefficient may be as follows:

$$k_{xy} = \frac{M_{xy}}{\sqrt{L_x L_y}}, 0 \le k_{xy} \le 1 \tag{5}$$

The voltage across the load resistor may be calculated based on one or more Kirchoff's voltage law (KVL) equations described herein:

$$\frac{V_L}{V_S} = \frac{j\omega^3 k_{12} k_{23} k_{34} L_2 L_3 \sqrt{L_1 L_4} \, R_l}{(k_{12}^2 k_{34}^2 L_1 L_2 L_3 L_4 \omega^4 + Z_1 Z_2 Z_3 Z_4 + \omega^2(k_{12}^2 L_1 L_2 Z_3 Z_4 + k_{23}^2 L_2 L_3 Z_1 Z_4 + k_{34}^2 L_3 L_4 Z_1 Z_2))} \tag{6}$$

Using one or more of the following substitutions:

$$Z_1 = R_{p1} + R_s + j\omega L_1 - \frac{1}{j\omega C_1} \quad (7)$$

$$Z_2 = R_{p2} + j\omega L_2 - \frac{1}{j\omega C_2} \quad (8)$$

$$Z_3 = R_{p3} + j\omega L_3 - \frac{1}{j\omega C_3} \quad (9)$$

$$Z_4 = R_{p4} + R_L + j\omega L_4 - \frac{1}{j\omega C_4} \quad (10)$$

the equivalent $S_{21}$ scattering parameter may be derived (e.g., as shown in equation (11)):

$$S_{21} = 2\frac{V_L}{V_S}\left(\frac{R_S}{R_L}\right)^{1/2} \quad (11)$$

Figure 4:
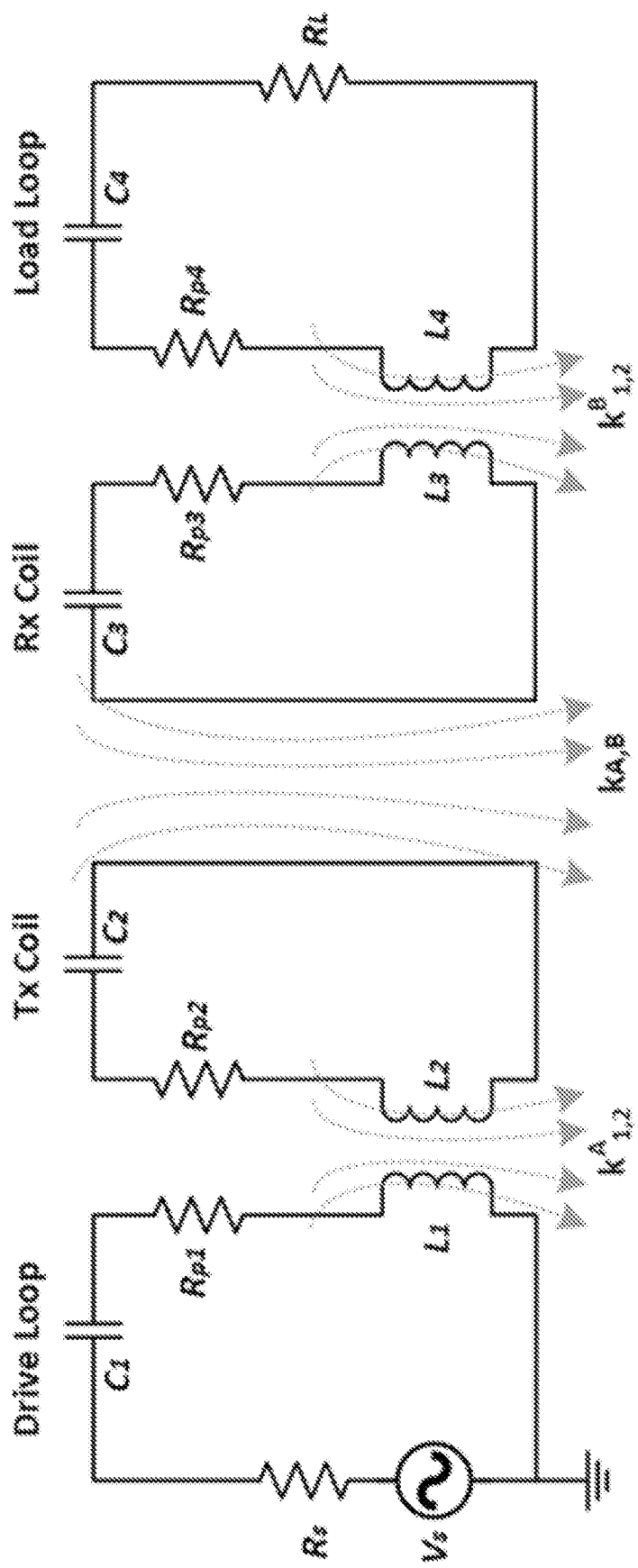
FIG. 4 illustrates an example resonance magnetic power transfer circuit.

The resonance magnetic system shown in FIG. 4 may use lumped circuit elements to describe a resonance magnetic (RM) system. FIG. 4 may shows examples of four circuits that are magnetically coupled as represented by coefficients, such as $K^A_{1,2}$, $K_{AB}$, and $K^B_{1,2}$. A drive loop (e.g., shown on the left side of FIG. 4) may be excited by a source with output impedance $R_s$, a drive loop (e.g., a single turn drive loop) modeled as inductor $L_1$, and/or with parasitic resistance $R_{p1}$. Capacitor, $C_1$, along with inductor $L_1$, may set the drive loop resonance frequency.

The transmit coil may include a multi-turn spiral inductor ($L_2$), with parasitic resistance ($R_{p2}$), and/or self-capacitance ($C_2$). Inductors (e.g., $L_1$ and $L_2$) may be linked with a coupling coefficient $K^A_{1,2}$. The receiver side may share a similar or the same topology.

The transmitter and receiver coils may be linked by a coupling coefficient, $k_{A,B}$. A coupling coefficient $k_{A,B}$ may vary, e.g., as a function of the distances between a transmitter to a receiver.

Coupling (e.g., critical coupling) and system parameters may be derived. For example, the coupling, such as the critical coupling, may be derived by substituting the term for series quality factor and resonant frequency into the transfer function as described herein.

$$Q_i = \frac{1}{R_i}\sqrt{\frac{L_i}{C_i}} = \frac{\omega_i L_i}{R_i} = \frac{1}{\omega_i R_i C_i} \quad (12)$$

$$\omega_i = \frac{1}{\sqrt{L_i C_i}} \quad (13)$$

The voltage gain at the center frequency wo may be presented, e.g., in one or more of the following equations.

$$\left(\frac{V_L}{V_S}\right)\bigg|_{\omega=\omega_0} = \frac{ik_{cc}k_{12}^2 Q_{coil}^2 Q_{loop}^2}{k_{cc}^2 Q_{coil}^2 + (1 + k_{12}^2 Q_{coil} Q_{loop})^2} \quad (14)$$

Parameter $k_{cc}$ may be a notation for the symmetric coil-to-coil coupling (e.g., $k_{AB}$ and $k_{BA}$) and the equation (14) may yield the following equation.

$$k_{crit} = \frac{1}{Q_{coil}} + k_{12}^2 Q_{loop} \quad (15)$$

At the coupling point (e.g., critical coupling point), the following equation may be derived.

$$|S_{21}|_{crit} = \frac{k_{12}^2 Q_{coil} Q_{loop}}{1 + k_{12}^2 Q_{coil} Q_{loop}} = \frac{k_{12}^2 Q_{loop}}{k_{crit}} \quad (16)$$

The parameter $k_{12}$ may be loop-to-coil coupling. Reducing the parameter $k_{12}$ may lower the parameter $k_{crit}$ and may increase range. Reducing the parameter $k_{12}$ may reduce efficiency (e.g., as shown in equation (16)).

An operating frequency band of a resonance magnetic system may be bounded. For example, at the low end of an operating frequency band of a resonance magnetic system, the operating frequency band may be bounded by the lowest natural resonance frequency supported by a network and/or a device. At the high end of the operating frequency band, the operating frequency band may be bounded by a frequency (e.g., a critical frequency) beyond which the coupling coefficient of the system falls off (e.g., drastically and/or irreversibly falls off).

Figure 5:
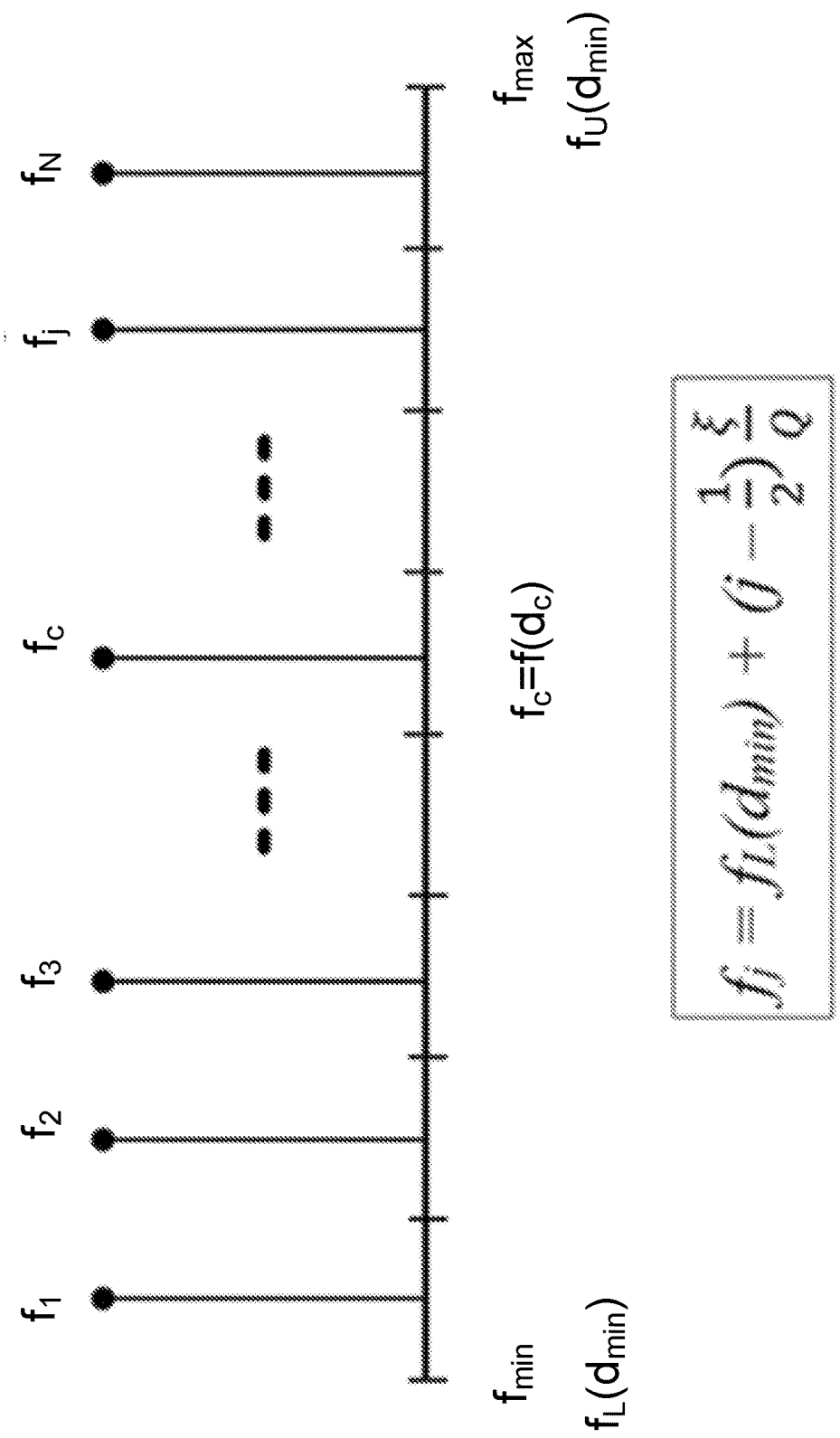
FIG. 5 illustrates examples of frequency bands in a resonance magnetic system.

FIG. 5 illustrates examples of frequency bands in a resonance magnetic system. An example design shown in FIG. 5 may consider one or more of the following: a parameter $D_{min}$ representing the minimum distance between two devices or between a network device (e.g., eNodeB, gNB, etc.) and a device; low frequency (e.g., the lowest frequency) and/or high frequency (e.g., the highest frequency) supported by a resonance magnetic system; and/or a quality factor (Q) (e.g., minimum Q) of tank devices.

Parameter $D_{min}$ may be determined and/or received. Parameter $D_{min}$ may represent the minimum distance between two devices or between a network device (e.g., eNodeB, gNB, etc.) and a device.

Low frequency (e.g., the lowest frequency, such as $f_{min}$) and high frequency (e.g., the highest frequency, such as $f_{max}$) may be determined and/or received. Low frequency (e.g., the lowest frequency) supported by the resonance magnetic system may be equivalent to low (e.g., the lowest) resonance frequency achieved at the minimum distance, e.g., that are determined and/or received. High frequency (e.g., the highest frequency) supported by the resonance magnetic system may be equivalent to high (e.g., the highest) resonance frequency achieved at the minimum distance.

$$f_{min} = f_L(d_{min}) \quad (17)$$

$$f_{max} = f_U(d_{min}) \quad (18)$$

A qualify factor (Q) (e.g., a minimum Q) of tank devices and/or a coarse raster may be determined and/or received.

Figure 6:
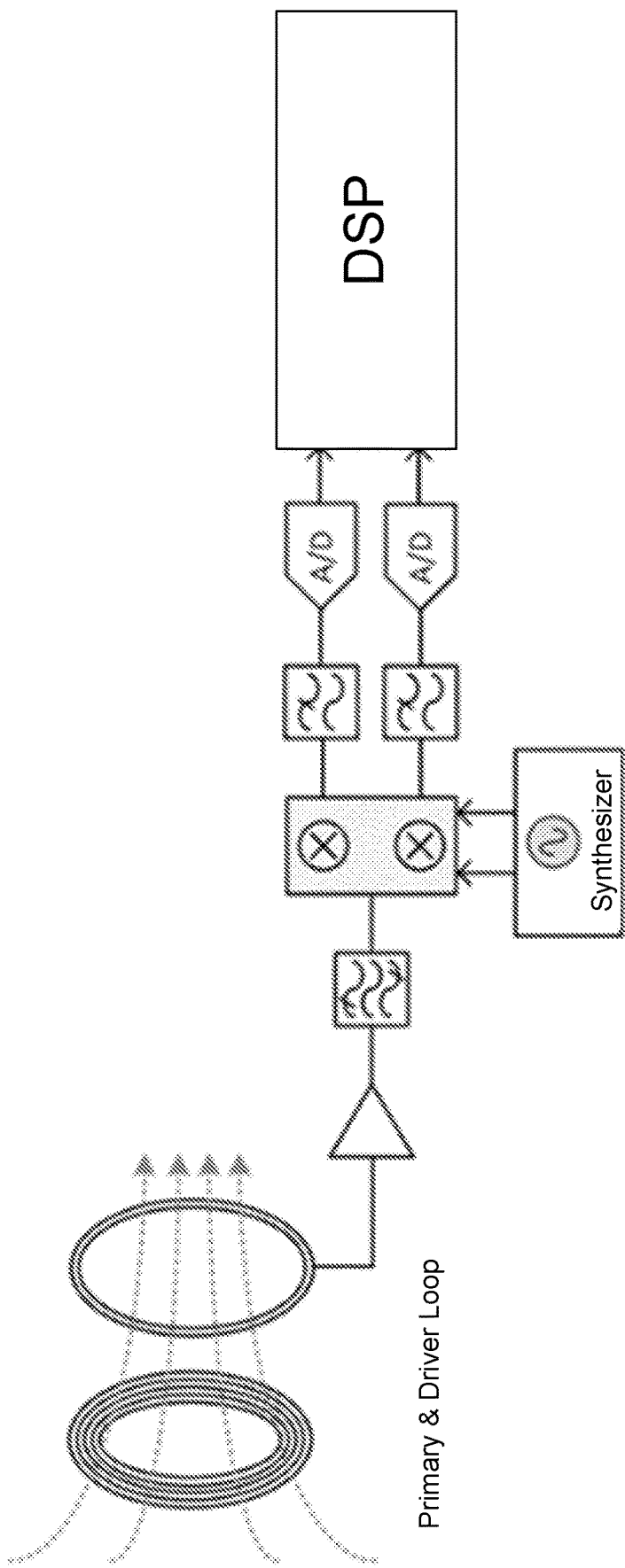
FIG. 6 illustrates an example receiver circuit for coupling coefficient measurement.

A receiver circuit for a coupling coefficient measurement may be provided. FIG. 6 illustrates an example of a receiver circuit for coupling coefficient measurement. The receiver circuit shown in FIG. 6 may determine the coupling coefficient between a network device (e.g., eNB, gNB, etc.) and a device. The receiver circuit may include one or more of the following: a multi-turn spiral coil; a load loop (e.g., a single turn load loop); a low-noise amplifier (LNA) stage followed by a band-pass filter; a quadrature demodulator and/or synthesizer blocks; a set of baseband filters and A-to-D converters; and/or a digital signal processor (DSP) block that may implement a peak finder algorithm (e.g., used to determine the strongest channels and/or set of carrier frequencies).

Figure 7:
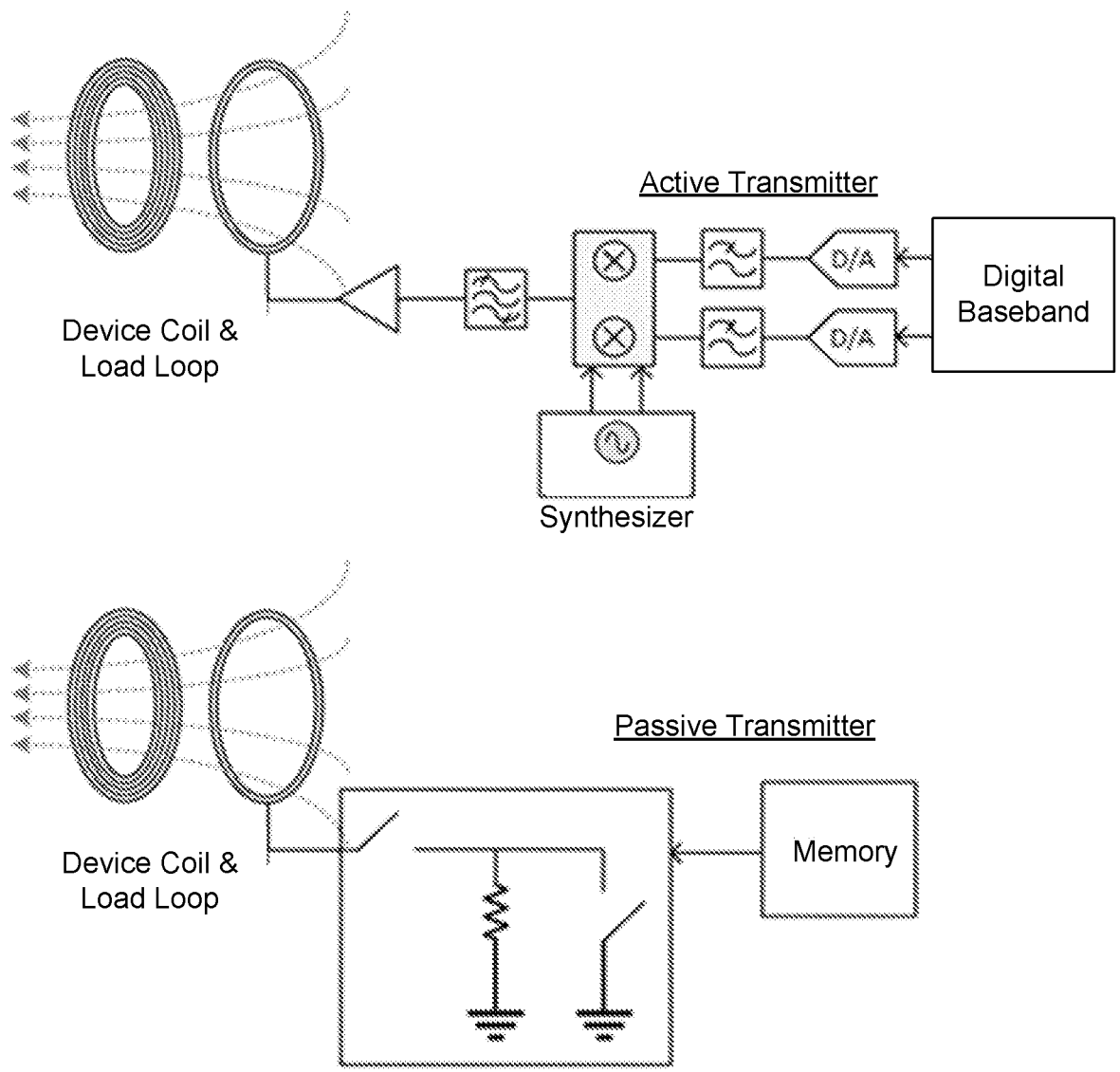
FIG. 7 illustrates an example transmitter circuit for reflecting modulated signals back to a network device.

FIG. 7 illustrates an example of a transmitter circuit for reflecting modulated signals back to a network (e.g., eNB, gNB, etc.). The transmitter circuit shown in FIG. 7 may include one or more of the following: a multi-turn spiral coil; a load loop (e.g., a single turn load loop that may be driven by a power amplifier (PA)); a PA; a band pass filter (BPF) (e.g., at the input of the PA); a digital signal that may be converted (e.g., first converted) to analog (e.g., by a set of D-to-A converters); a set of D-to-A converters; reconstruction filters; and/or I/Q signals that may be up-converted (e.g., using a quadrature modulator after passing through reconstruction filters). A passive transmitter may be based on backscattering using load modulation techniques.

Mid-field in WPT systems may be controlled. In non-radiative WPT systems, energy may be transferred via electromagnetic (EM) near-field. Near-field may be manipulated with one or more of the following: coupling between the transmitter and the receiver may focus the near-field using metamaterials; a particular power transfer path may be created by placing a series of WPT resonators (e.g., identical WPT resonators) along that path; and/or a quasi-uniform magnetic field may be generated by a multi-coil transmitter.

A metamaterial may be an artificial electromagnetic structure including one or more periodic elements. The metamaterial may be designed to achieve properties which do not exist in nature. Maxwell equations may provide a governing principle of how the electromagnetic fields (EMF) interact with the matter. Permittivity epsilon ($\varepsilon$) and permeability mu ($\mu$) may be intrinsic electromagnetic properties of matter intervening in the equations.

In nature, most of the materials may have epsilon ($\varepsilon$) and mu ($\mu$) positive. A double negative (DNG) material with epsilon and mu negative may not exist. Man-made metamaterials may exist and may exhibit negative properties, e.g., DNG properties. Using the man-made metamaterials having DNG properties, unusual phenomena may occur. For example, negative refraction, backward wave propagation, reversed Doppler shift, evanescent field enhancement, and/or the like may occur.

For magnetic resonance power transfer (MRPT) systems, power may be transferred between resonators (e.g., via coupling of evanescent fields). Evanescent wave amplification property(ies) of metamaterials (e.g., unique evanescent wave amplification property of metamaterials) may be applied. The WPT efficiency may be increased, e.g., by amplifying the near evanescent field. The WPT efficiency may be increased by inserting a negative-index metamaterial between the transmitter and the receiver.

Resonators may be included in near and mid-field WPT systems. Resonators may affect the performance of a WPT system. For example, WPT resonators may be designed to minimize transfer losses and may be engineered with a high Q-factor. WPT resonators may be grouped according to topology and/or materials of the WPT resonators. For example, WPT resonators may include one or more of the following: metallic-coil based resonators; dielectric resonators; and/or cavity mode resonators.

Inductance in metallic-coil based resonators may be generated by a spiral wire. Capacitance of the self-resonance coil may be provided by the spacing between a turn of wire (e.g., each turn of the wire). For an LC resonance coil, a lumped capacitor may provide the capacitance.

Dielectric materials with high permittivity and/or low dielectric loss may be used to fabricate WPT resonators (e.g., dielectric resonators). Resonators having a high Q-factor may be used to create a WPT system (e.g., an efficient WPT system). An operational principle of the WPT system may be derived from Mie theory. For example, bound charges inside the dielectric resonator may respond to an external magnetic field in such a way that different order of magnetic multipolar modes may be formed. The Mie theory may be a theory of absorption and scattering of plane electromagnetic waves by uniform isotropic particles of the simplest form (e.g., sphere or infinite cylinder), which may be in a uniform and isotropic dielectric infinite medium.

In a cavity resonator, one or more (e.g., all) EM fields may be configured to be (e.g., confined) inside a cavity. The energy stored in the field may be employed (e.g., fully employed) without leaking into free space. High power transfer efficiency (>60%) may be achieved for a large volume of space inside the cavity.

Resonance magnetic coupling (RMC) may facilitate mid-field wireless power transfer (WPT). RF links may use wireless technology, such as Wi-Fi and/or Bluetooth. The RF links may be used in WPT products to provide a RF overlay control signaling. Carrying control and user-payload data over the RMC communication link may reduce costs, may increase robustness for communications (e.g., in harsh RF environments), and/or may replace radio overlay connections. The RMC communication may provide added privacy and security, e.g., simultaneously.

An inherent coupling-efficiency and mobility trade-off associated with RMC based communications systems may exist. That is, if the coupling efficiency K between devices (e.g., two devices) is high at distance A and orientation A', the coupling efficiency K may be low (e.g., lower) at new distance B and orientation B'. The RMC communication with a mobility in a midfield (e.g., preferred in the midfield) and high coupling K may be implemented, which may provide effective WPT and/or communication link quality.

Features that addresses the efficiency and mobility tradeoff associated with a region WPT (e.g., a midfield region WPT) may be described herein. Device discovery mechanisms may be considered, e.g., in RMC-based communication. For example, apparatus and mechanisms may be described herein for the efficiency and mobility tradeoff. Mechanisms for enabling initial device discovery, link establishment, and adaptation mechanisms in resonance magnetic coupled communication systems may be described herein.

Operating volume may include a range (e.g., a maximum range) between devices, within which, transfer efficiency may be maintained at a relatively constant level. The transfer efficiency may be maintained at a relatively constant level independent of distance, if the right frequency is chosen. Beyond that range, such as beyond the critical distance, efficiency may decline (e.g., decline sharply).

In resonance magnetic coupled systems, coupled circuits may include series of resonators that are linked by inductances (e.g., mutual inductances) expressed as coupling coefficients.

Minimum frequency (Fmin) and maximum frequency (Fmax) may be provided. In examples, the Fmin and Fmax for non-beam WPT systems may be 6,765-6,795 kHz. In examples, the Fmin and Fmax for WPT systems (e.g., WPT systems using technologies other than RF beam) may be 19-21 kHz, 59-61 kHz, 79-90 kHz, 100-300 kHz, or 6765-6795 kHz. In examples, the Fmin and Fmax for wireless power consortium (WPC) may be 87-205 kHz range.

Channel raster may be steps or frequencies that may be used by a communication device. For example, in the UMTS system, the channel raster may be 100 kHz. For wireless power transmission using technologies other than radio frequency beam, the frequency of the WPT device may be 9 kHz or 10 kHz raster (e.g., precisely and consistently land on the 9 kHz or 10 kHz raster).

RMC beacons may be used in a RMC communication system. One or more discovery beacons and/or sequence structures may be used for signaling in a RMC communication system. For example, one or more of the following may be used for signaling in the RMC communication system: pseudo-random sequences; chirp sequences; and/or beaconing based on modulated or unmodulated continuous wave (CW) or a RF tone (e.g., a single RF tone).

A RMC communication system may use pseudo-random sequences that exhibit statistical randomness. Pseudo-random sequences may be generated by deterministic processes. A RMC communication system may use chirp sequences where a sweep signal frequency may increase or decrease with time (e.g., linearly, exponentially, etc.). Chirp signals may be used (e.g., extensively used) in ranging applications. A RMC communication system may use beaconing based on modulated or unmodulated CW. Beaconing based on an RF tone (e.g., a single RF tone) may be used.

Beacons may be sent based on scheduling. For example, beacon scheduling may include fixed, adjustable, and/or pseudo-random timed beacon scheduling. Beacons or discovery signals transmitted by the RMC device may be sent according to a fixed or adjustable schedule.

Beacon periods may be defined as consecutive time slots (e.g., of equal length). For the fixed beacon schedule example, the node may send a beacon packet in a beacon period (e.g., every beacon period). Beacon packets may be sent (e.g., regularly sent) by a node with the appropriate information to establish a connection. Other nodes may scan for the beacon packets to discover one or more neighboring devices.

For the adjustable beacon schedule example, the beacon period may be a tunable parameter. A beacon transmitting node may not follow a periodic transmission schedule (e.g., with a defined fixed period). For example, the beacon transmitting node may determine that the node has delay sensitive information to be conveyed (e.g., to a cluster head). The beacon transmitting node may transmit beacons with high periodicity (e.g., short period duration) and may speed up the discovery mechanism. For the adjustable beacon scheduling, the pseudo-random scheduling algorithm may perform intra- and/or inter-node beacon scheduling in RM communication.

A node (e.g., every node) may send beacon messages (e.g., regularly send beacon messages) at pseudo-randomly selected time slots. The beacon messages may include the information about the node that the neighbors may need to initiate and establish connection. If a node wants to discover its neighbors or if a node wants to update the information of the node about the neighbors, the node may scan for beacon packets (e.g., beacon messages). In examples, the scanning process may be continuous. In examples, the scanning process may be discontinuous (e.g., random). For example, the scanning process may be done for short periods of time if the node is not receiving or transmitting data.

The devices may account for the beacons from the neighboring devices. The beacon packets may be given a priority. For example, the beacon packets may be given a higher priority than baseband data packets. The devices may pause (e.g., not start) data packet transmission if the transmission overlaps with a beacon timeslot (e.g., for the higher priority beacon packet transmission).

If a data packet is lost, e.g., due to the random beacon scheduling process, the packet loss may be corrected by an automatic retransmission query (ARQ) mechanism.

Beacon transmission may be event driven. Beacon transmission may be sent based on the occurrence of one or more events as quality, strength, and/or bandwidth of the RMC link falling below a threshold value (e.g., a critical threshold value). The nodes wanting to be discovered may transmit beacon packets if the one or more events described herein occur.

Beacon transmission may be user initiated. Transmission of beacons or sequences for discovery signals in RMC communication may be user initiated (e.g., to improve energy efficiency and/or battery life of portable or mobile devices).

Channel finding may be initiated. For example, initial discovery mechanism may occur between devices.

A discovery mechanism may be used for devices to transmit and exchange information and may enable RMC communication between devices. The discovery mechanism may establish a RMC communication channel and may determine its parameterization. A device (e.g., a first device or a first WTRU used as an example herein) using RMC communication may sense a channel for potential beacon or sequence signals from other devices (e.g., a second device or a second WTRU used as an example herein).

A device may use RMC communication to detect a beacon or sequence during discovery or during a lifetime of the RMC link. The device using the RMC communication may use such a signal to determine one or more characteristics of the RMC link, such as one or more parameters of the RMC link, and to derive transmission or reception settings. For example, the device may determine an ID associated with the device, a loop-to-coil coupling associated with the device, a frequency and/or a bandwidth that has a high (e.g., the highest) SNR value, and/or the like. The device may use the absence of a received beacon or a discovery signal determined through sensing to initiate its own discovery mechanism. If the channel remains idle for a predetermined period, the device using RMC communications may transmit its own beacon or sequence for discovery.

Beacon or sequence transmissions for discovery and link management by RMC devices may be configurable, controlled, or scheduled (e.g., to minimize interference or to avoid harmful emissions).

In ad hoc and cellular networks, discovery of devices may be based on a party transmitting a known synchronizing reference signal sequence or beacon. The peer devices may coordinate to meet in space, time, and frequency (e.g., for discovery of devices transmitting the known synchronizing reference signal sequence or beacon). Without a coordination (e.g., coordination in space, time, and/or frequency), a randomized mechanism may perform discovery, and one of the peer devices may assume the responsibility of sending the beacon that may be utilized for the discovery of the devices. The arbitrating and/or transmitting/searching for the beacon may be time and energy consuming.

An interference level metric may be used (e.g., to reduce interference among disjointed paths). One or more nodes may record the list of interfering neighbors. For example, the nodes may record the list of interfering neighbors by overhearing route discovery messages and data packets unintended for their usage. As data acknowledgement messages travel along the reserve path, the interference level of a path may be computed. The interference level of a path may be computed as a ratio of total number of interfering nodes to a number of intermediate nodes. The set of paths that minimizes interference may selected.

Range adaptive scheme parameters may be used. Transmission of beacons for discovery may use a range adaptive scheme. Beacon sequences may use different sequence types or parameterization, bandwidth, power settings, and/or signal durations to be adjusted for discovery in the context of variable range between RMC communication devices.

A device with a passive receiver may harvest energy. For example, the device with a passive receiver may initially need to harvest energy in order to send a beacon response. An interrogating device, after an (e.g., each) unsuccessful attempt, may increase the beacon duration to allow for a longer harvest period. An interrogating device may be a device that sends a beacon signal to discover one or more neighboring devices, such as one or more responding devices.

For devices located at a sub-optimal distance and orientation, such as where the coupling efficiency is poor, the interrogating device may ramp up the transmit power after a (e.g., each) unsuccessful beaconing attempt.

For devices in the vicinity of the critical distance, where the two channel resonant frequency peaks are in close proximity, the discovery mechanism may operate within a narrow range of the RM frequency band.

The changes in beacon duration and power levels described herein may be triggered by a weak beacon response or low signal-to-noise-ratio (SNR). The weak beacon response or the low SNR may indicate to the interrogating device that the channel condition may be poor or the responding device may be a passive transceiver with energy harvesting needs. A responding device (e.g., a second device) may be a device that receives a beacon signal from an interrogating device (e.g., a first device), e.g., to be discovered.

Figure 8:
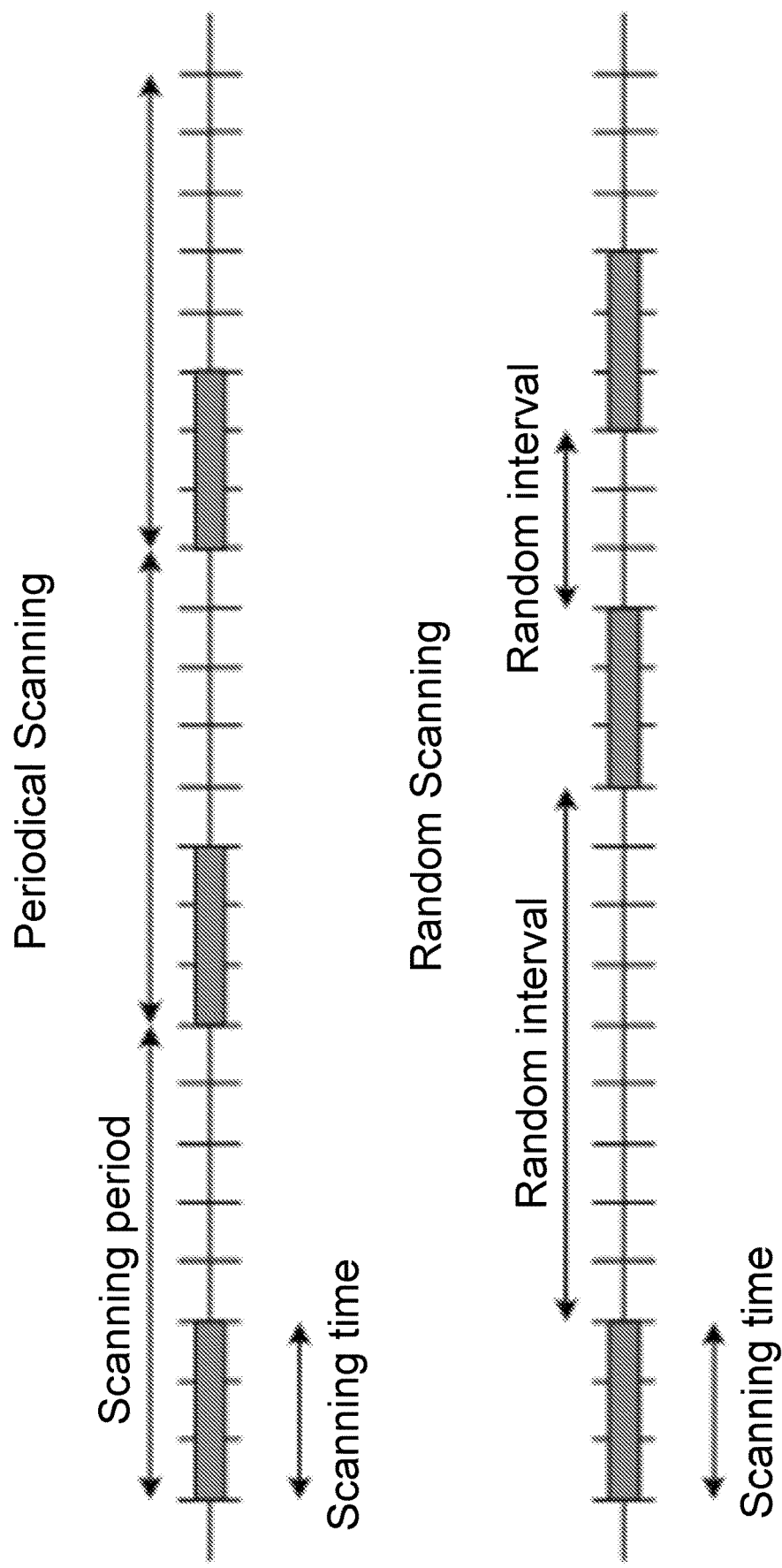
FIG. 8 illustrates example scanning schedules by a device.

A first device, such as a first WTRU, may perform scanning. To discover a second device (e.g., a second WTRU or one or more neighboring device of the first device) and/or to update the status information of the second device, the first device may initiate a scanning mechanism. During the scanning period, the first device may skip sending or receiving data packets. The first device may listen for beacon packets. The duration and timing of the scan periods may be unfrozen in time (e.g., flexible). For example, the duration and timing of the scan periods may be tuned according to the need for the first device. FIG. 8 illustrates example scanning schedules by a first device. As shown in FIG. 8, the first device may have a periodic scanning schedule. For example, the first device may listen (e.g., periodically listen) for transmissions of other devices over a frequency. The first device may switch between one or more (e.g., multiple) frequencies. The first device may switch between one or more (e.g., multiple) frequencies systematically. The first device may switch between one or more (e.g., multiple) frequencies randomly. The different frequencies scanning schedules may be multiplexed in time. The first device may discover a second device(s) and/or update status information of the second device(s) during the periodical scanning.

The first device may follow a random scanning schedule as shown in FIG. 8. For example, the first device may follow a random scanning schedule where the time duration between the scanning instances (e.g., between the two scanning instances) of the same frequency follows a distribution. Different frequencies considered during the scan may be selected (e.g., systematically or randomly). The schedule may be multiplexed in time. During a scan instance/duration, the first device may listen to frequency, e.g., to that one frequency.

A wideband-narrowband mechanism may be described herein.

A device using RMC communication may transmit a discovery signal to determine channelization and/or properties of an RMC link. The discovery signal may be generated in a form of a beacon transmission. A signal sequence may be employed for a discovery signal.

Figure 9:
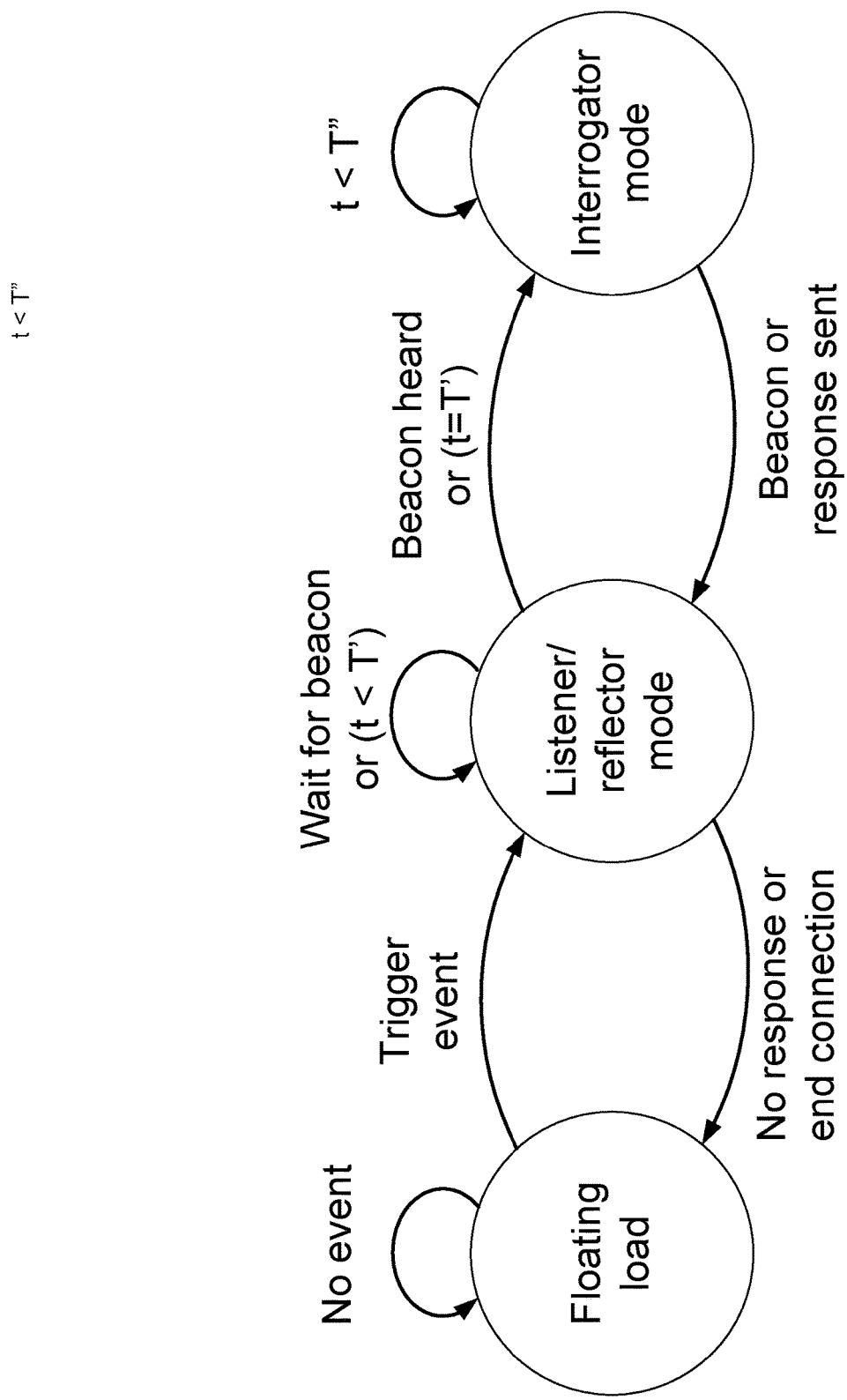
FIG. 9 illustrates example state transitions between floated state, listening mode, and interrogation mode.

A device may (e.g., during a normal operation) enter sleep mode after a prespecified period of inactivity. The discovery mechanism may be triggered by a network, by a user, or by a threshold event in the device as described herein. FIG. 9 illustrates example state transitions between floated state (e.g., sleep state), listening mode, and interrogation mode (e.g., active mode). As shown in FIG. 9, a device state may transition from one to another based on one or more associated trigger events.

A device may be in a floating state (e.g., floating load). In the floating state, the resonant circuitry may not affect a RM channel. Upon detecting and/or receiving a trigger event (e.g., user initiation, battery charge level falling below a specific threshold, etc.), the device may move from the floating state (e.g., where the resonant circuitry may not affect the RM channel) to listener/reflector mode, as shown in FIG. 9. In the listener/reflector mode, the device may listen for a beacon for a prespecified time T'. If a beacon is not received, the device may enter an interrogator mode and may transmit its own beacon. The device may wait for a beacon response for a period of T" before returning to the reflector mode. If no other device is within the range (e.g., the device not receiving a beacon response), the device may return to the floating state (e.g., the floating load) and wait for the next event trigger to wake-up and start the mechanism described herein over.

In examples, a pseudo-random sequence (e.g., wideband) beacon may be used during a discovery for RMC communication. The device may use a pseudo-noise (PN) code combined with an unmodulated CW tone or carrier modulation techniques (e.g., on-off keying (OOK), binary phase shift keying (BPSK), quadrature phase shift keying (QPSK), etc.) to transmit a beacon sequence as described herein.

Figure 10A:
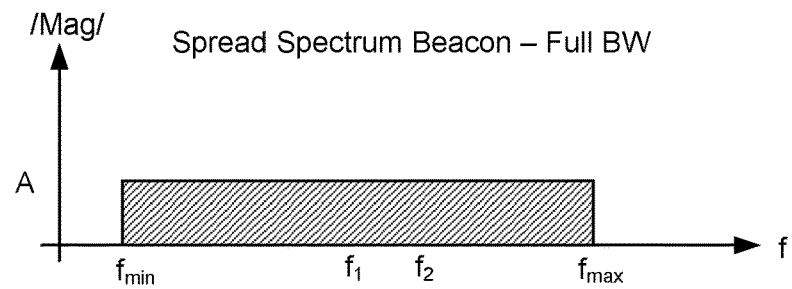
FIG. 10A illustrates an example associated with a device discovery mechanism using spread spectrum bisection.
Figure 10A:
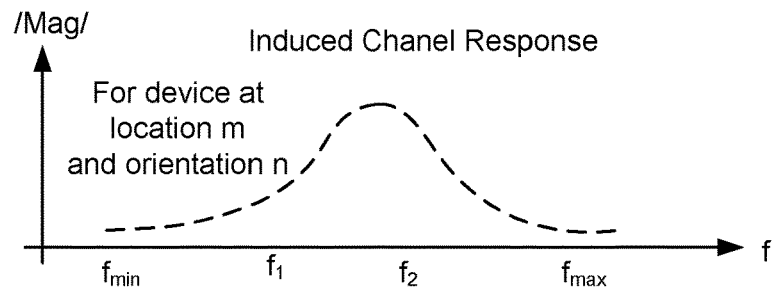
Figure 10A:
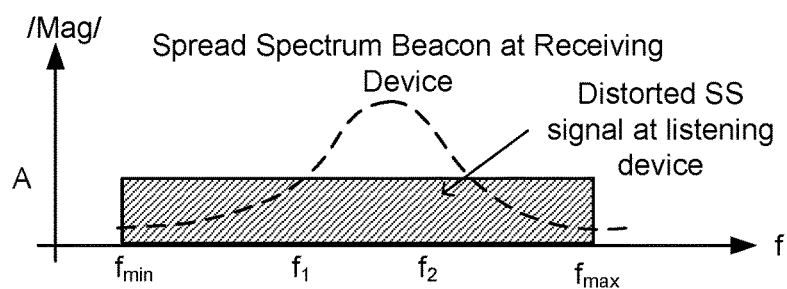
Figure 10A:
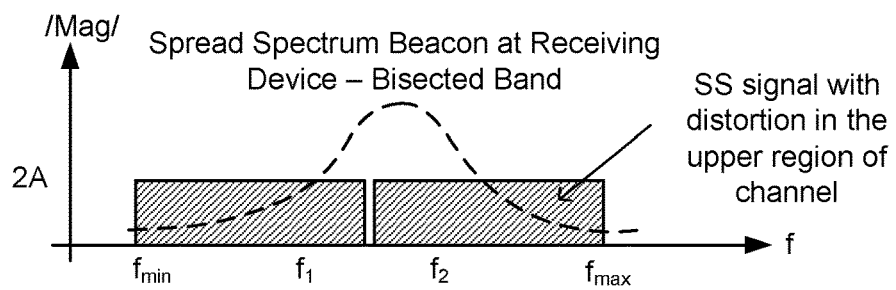
Figure 10A:
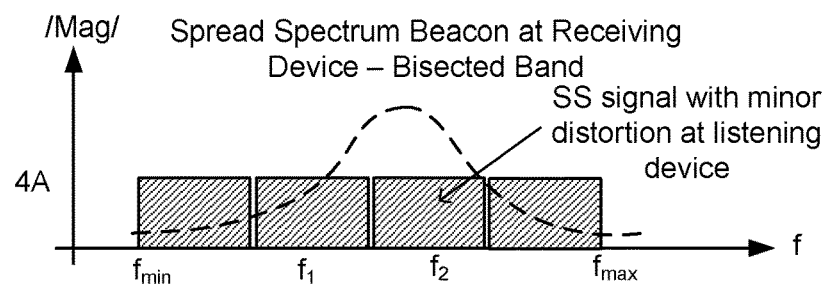
Figure 11:
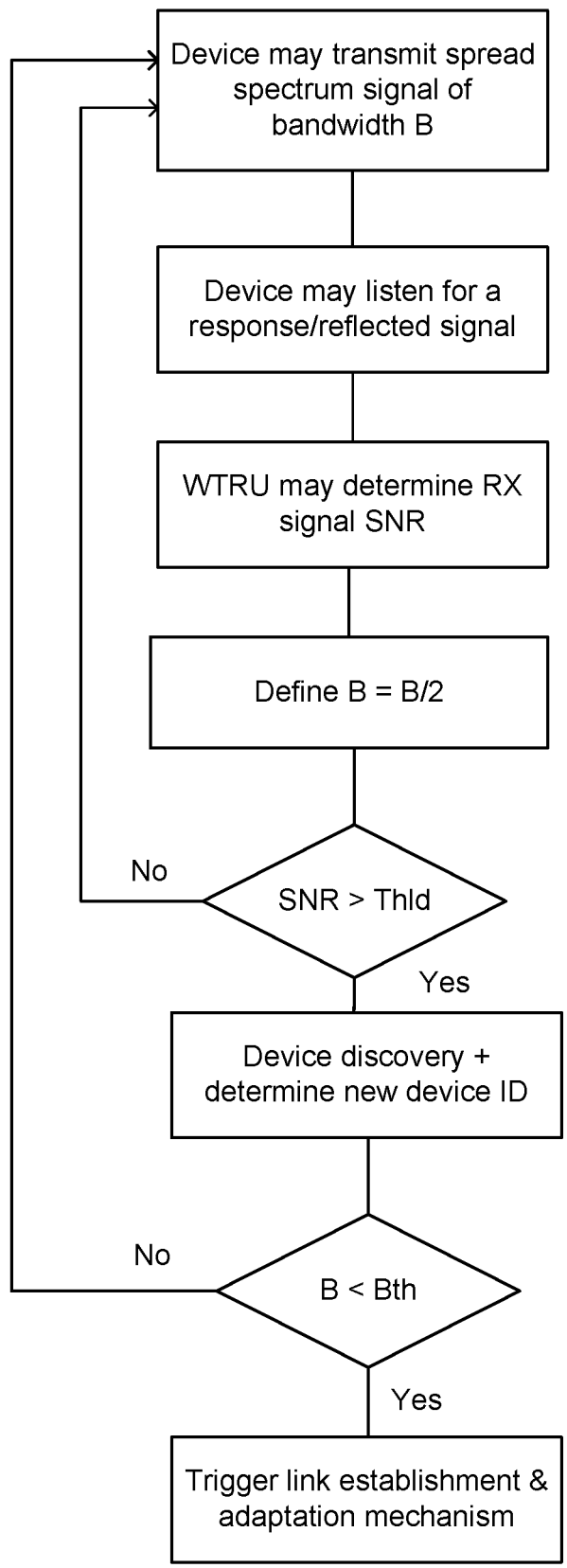
FIG. 11 illustrates an example device associated with a discovery mechanism spread spectrum bisection.

FIGS. 10A, 11, and/or 16 illustrate examples associated with a discovery mechanism, e.g., using spread spectrum splitting (e.g., bisection). A first device may initiate a discovery mechanism by transmitting a spread spectrum signal of a bandwidth (e.g., in/across the bandwidth), for example, as shown in FIGS. 10A, 11, and/or 16. The bandwidth of the spread spectrum signal may be approximately equal to (e.g., the same as) a resonance magnetic spectrum of interest (e.g., a full resonance magnetic spectrum of interest).

The first device may listen for a response or a reflected signal (e.g., as shown in FIGS. 10A, 11, and/or 16). A response may be from a second device (e.g., a second WTRU or a neighboring device of the first device). The response may be a reflected signal. The first device may determine a SNR value associated with the response (e.g., the reflected signal, if any, from the second device/WTRU).

As shown in FIGS. 10A, 11, and/or 16, if the first device does not receive a response (e.g., an SNR associated with the response or the reflected signal being below the threshold), the first device may split (e.g., bisect) the bandwidth into sub-bands (e.g., two half-bands) and transmit (e.g., consecutively transmit) the spread spectrum signal (e.g., the spread spectrum beacon) in each one of the sub-bands (e.g., half-bands). An average power level associated with the bandwidth (e.g., the initial and unsplit bandwidth) may be the same as an average power level associated with each sub-bands (e.g., the split bands or two half-bands). An average power level associated with each of the sub-bands (e.g., each of the split bands or each of the two half-bands) may have the same average power level (e.g., approximately the same) as the average power level associated with the bandwidth (e.g., the initial and unsplit bandwidth). For example, a power level associated with either the first sub-band or the second sub-band is approximately twice as much as the power level associated with the same portion of bandwidth associated with the initial transmission (e.g., unsplit bandwidth). The first device may listen for a response (e.g., a reflected signal) and may repeat SNR measurements for a sub-band (e.g., each of the sub-bands). The first device may repeat the discovery mechanism described herein and may complete a SNR measurement table for one or more (e.g., all) prespecified bandwidth settings.

As shown in FIGS. 10A, 11, and/or 16, if a beacon response or a reflected signal is received (e.g., an SNR associated with the response or the reflected signal being equal to/greater than the threshold), the first device may compute one or more parameters. For example, the first device may compute one or more of an ID (e.g., an unique ID) associated with the second device (e.g., the neighboring device), a channel coupling coefficient, such as loop-to-coil coefficients, a channel/bandwidth, and/or a gain. The first device may select a center frequency associated with the sub-band with the SNR level (e.g., the highest SNR level). For example, the first device may select the center frequency associated with the sub-band with the highest SNR level to meet a minimum quality of service requirement for RM power transfer or communication.

If the transmitted signal (e.g., transmitted from the second device to the first device) exceeds a minimum threshold (e.g., if the transmitted signal is equal to/greater than the minimum threshold) and the signal arrives at the receiver (e.g., the receiver associated with the first device) with an acceptable level of distortion from an induced channel, the receiver (e.g., the receiver associated with the first device) may detect (e.g., successfully detect) and may decode the beacon signal. Data may be modulated (e.g., amplitude modulated) on a CW tone. If the transmitted signal (e.g., from the second device) is below a threshold (e.g., below the minimum threshold), the first device may repeat splitting (e.g., bisecting) the spread spectrum signal in sub-bands into sub-bands (e.g., two half sub-bands) and repeat determining the SNR value of the response (e.g., the reflected signal).

If a device, such as the first device, operates in a power saving or an energy conservation mode, the device may configure a sleep counter with a longer duty cycle period before entering floated-load mode. The device may wake up, after the configured longer duty cycle period, to receive and decode beacons (e.g., potential periodic beacons).

If the device, such as the first device, receives an event trigger, such as a high priority event trigger, the device may accelerate the discovery mechanism described herein. For example, the first device may shorten the sleep timer to accelerate the discovery mechanism.

FIG. 10A illustrates an example associated with a device discovery mechanism using spread spectrum bisection. One or more of the following may apply. As shown in FIG. 10A, a first device may initiate a device/link discovery mechanism (e.g., and may include features shown in FIGS. 10A, 11, and/or 16) by transmitting a spread spectrum signal of a bandwidth (e.g., in/across a bandwidth) spanning a full spectrum (e.g., the full spectrum specified by a resonance magnetic standard or determined by a previous iteration of the discovery mechanism described herein). The first device may listen for a response (e.g., in a form of a reflected signal) and may determine an SNR value associated with the received response signal. If an SNR value associated with the received response is above (e.g., above or equal to/greater than) a preconfigured threshold (e.g., a specified threshold), the first device may discover a second device (e.g., a listening device/neighboring device of the first device) in the considered band (e.g., the bandwidth) and may decode a unique ID associated with the second device. The first device may initiate link establishment and adaptation mechanisms described herein, e.g., using the detected unique ID. The first device may transmit an acknowledgement indication (e.g., an acknowledgement message) to the detected second device, e.g., to prevent the second device from listening/reflecting signals corresponding to subsequent beacon/discovery signal transmissions. If an SNR value associated with the received response is below the preconfigured threshold or if no response and/or no reflected signal is received (e.g., the SNR value equal/close to 0), the first device may transmit (e.g., sequentially in time) a spread spectrum sequence of sub-bands (e.g., in/across sub-bands). For example, the device may split (e.g., bisect) the bandwidth of the spread spectrum into sub-bands (e.g., two sub-bands). The sub-bands may be half of the spectrum/bandwidth used in the initial discovery mechanism. The first device may repeat (e.g., for each sub-band) the actions subsequent to transmitting the spread spectrum signal of bandwidth spanning the full spectrum described herein. The first device may repeat listening to the response (e.g., from the second device) using the split bandwidth (e.g., sub-bands) and determining the SNR value of a reflected signal for a sub-band (e.g., each sub-band) as described herein. The first device may determine if the second device has been discovered in a considered sub-band (e.g., if the SNR of the associated reflected signal is equal to/greater than a threshold in the sub-band), decode the unique ID for the discovered second device, and initiate the link establishment and adaptation mechanisms described herein. The first device may transmit an acknowledgement indication (e.g., an acknowledgement message) to the detected second device as described herein (e.g., if the SNR of the associated reflected signal is equal to/greater than the threshold in the sub-band).

If a goal is to find a second device (e.g., one second device), the first device may stop splitting/bisecting the scanned band after the discovery of the second device. If a goal is to find one or more (e.g., all) second devices within a range (e.g., in/across the bandwidth), the first device may continue to split/bisect (e.g., further split/bisect) the scanned band (e.g., the bandwidth), e.g., after discovering the second device. For example, if the goal is to discover one or more (e.g., all) second devices within a range, the first device may continue to split/bisect the scanned band, e.g., until a preconfigured bandwidth (e.g., a smallest preconfigured bandwidth), to discover one or more second devices in the range.

Figure 10B:
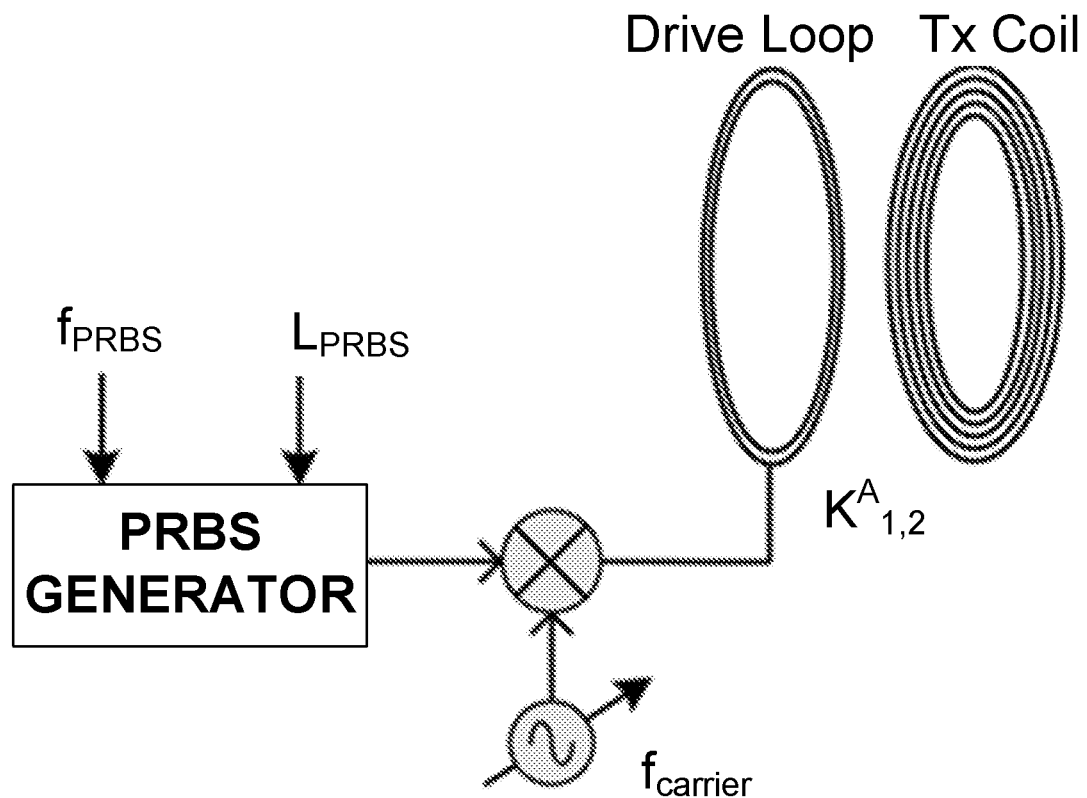
FIG. 10B illustrates an example of a pseudo-random sequence (e.g., wideband) beacon during discovery for resonance magnetic coupling (RMC) communication.

FIG. 10B illustrates an example associated with using a beacon, e.g., a pseudo-random sequence (e.g., wideband) beacon, during discovery for resonance magnetic coupling (RMC) communication. As shown in FIG. 10B, a pseudo-random binary sequence (PRBS) generator may be used.

Figure 16:
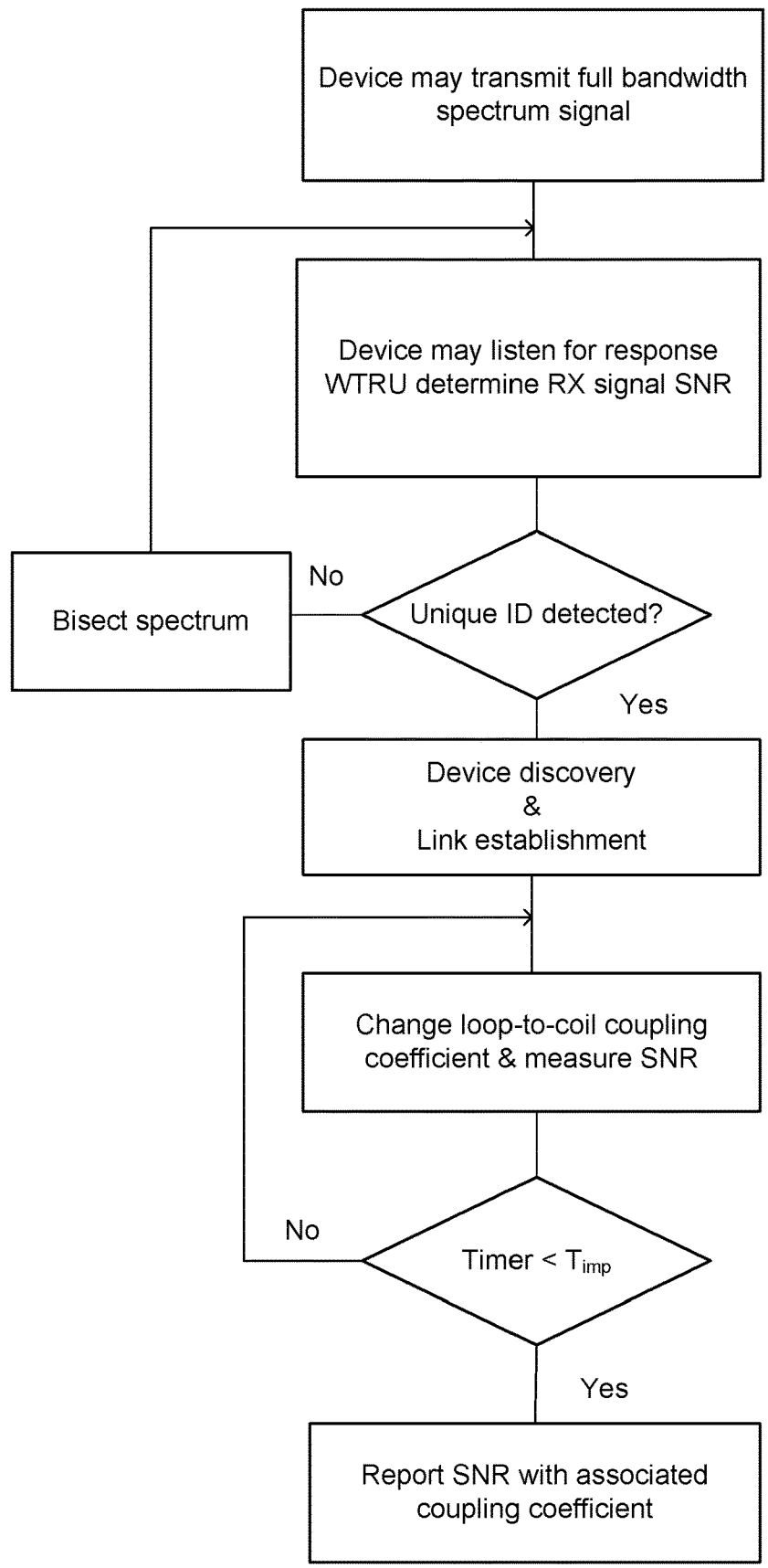
FIG. 16 illustrates an example associated with a device discovery mechanism spread spectrum bisection.

FIG. 11 illustrates an example associated with a device discovery mechanism using a spread spectrum bisection, e.g., which may use one or more associated features as described herein. FIG. 16 illustrates an example associated with a device discovery mechanism, e.g., which may use one or more associated features as described herein, using a spread spectrum bisection.

Range may be extended. For devices located close to or slightly beyond the critical distance where signal quality is poor, range extension may be used to aid with the discovery. The range extension described herein may extend the beacon duration and/or power level. The device may use a lookup table that includes listing of time duration and power levels to produce a ramping profile. The device may use a first power level for a first duration and may change the power level (e.g., to a second power level) for a second duration (e.g., and produce the ramping profile). The device may wait for a period of time (e.g., a specified amount of time) for a response after each step of the ramp.

Figure 12:
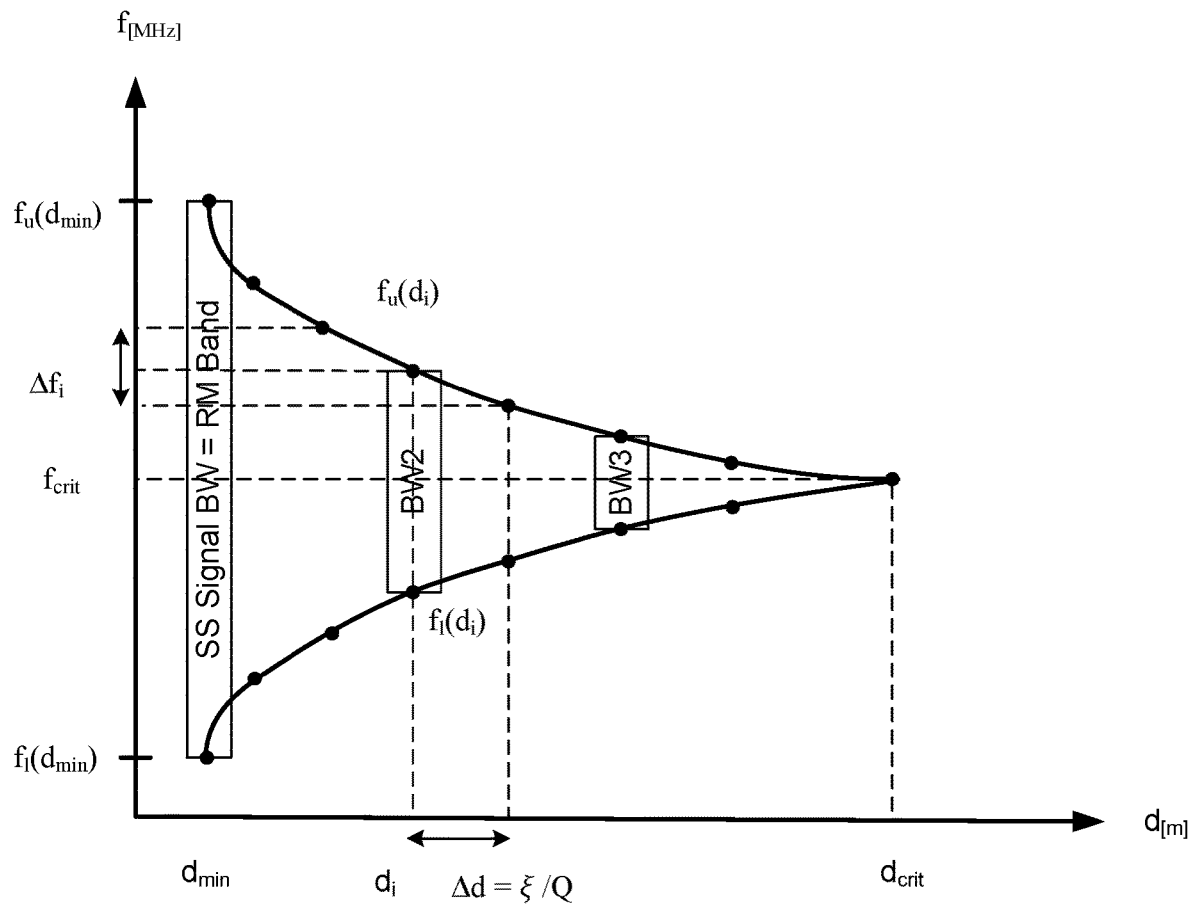
FIG. 12 illustrates an example change in distance between RMC communication devices.
Figure 13:
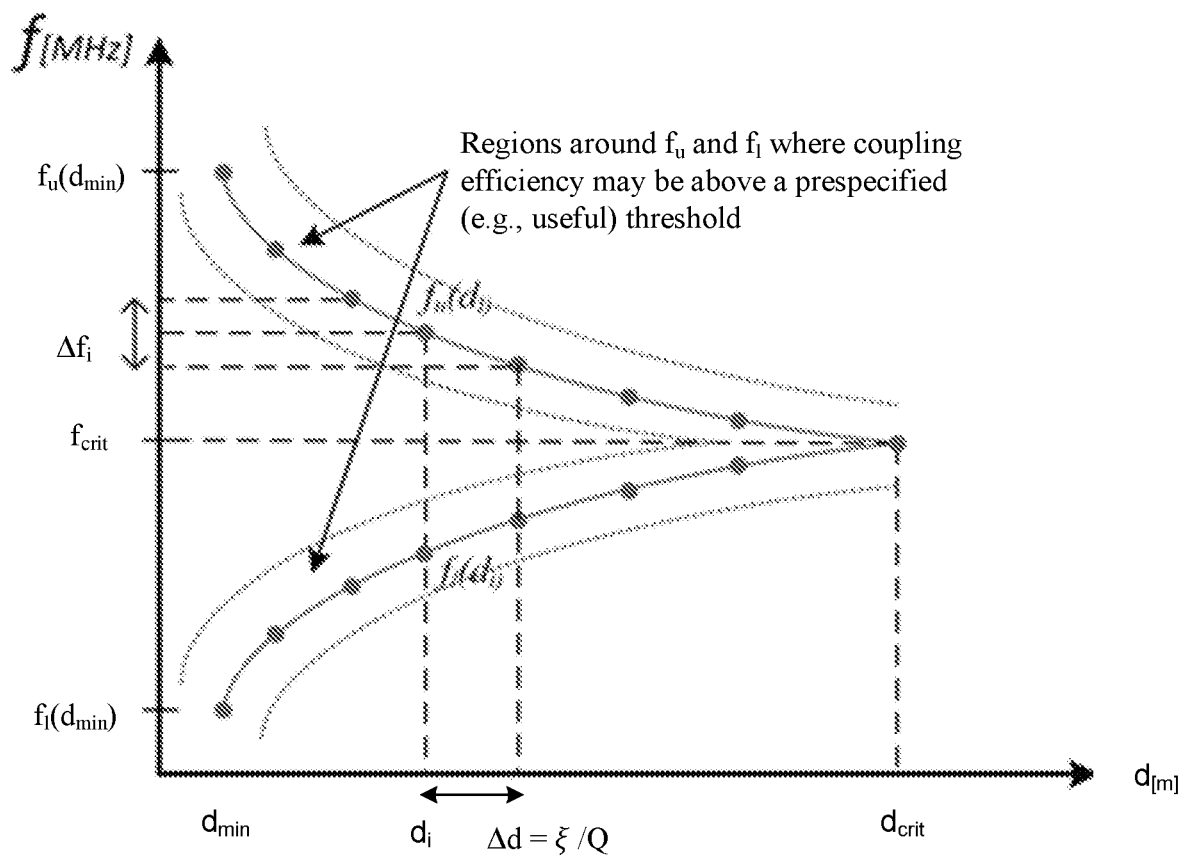
FIG. 13 illustrates an example of frequency splitting effect observed with a change in the distance between RMC communication devices.

FIG. 12 illustrates an example observation (e.g., trade-off) between RMC communication bandwidth versus distance (e.g., similar to FIG. 13 described herein).

The resonant frequency pair separation versus distance tradeoff associated with RMC communication may be illustrated FIG. 13. As shown in FIG. 13 (and/or FIG. 12), as the distance between devices increases, the separation between frequency pairs (e.g., the best frequency pairs) for efficient energy transfer may converge to a frequency $f_{crit}$. At the critical distance $d_{crit}$, the two frequencies may be similar (e.g., identical). Beyond the critical distance $d_{crit}$, the coupling efficiency may be reduced (e.g., severely reduced).

As described herein, FIG. 13 illustrates the trade-off between resonance magnetic coupling communication frequency pair separation and distance. The dotted lines around the two frequency mode curves shown in FIG. 13 may show regions where the coupling efficiency is above a prespecified threshold. Below that threshold or outside the dotted line pairs, the RMC channel may be attenuated (e.g., highly attenuated), and the WPT and communication may fail to establish.

FIG. 13 illustrates an example of frequency splitting effect observed with a change in the distance between RMC communication devices. One or more of the following equations may be used.

$$\text{Band center} = f_c(d_{crit}) \qquad (19)$$

$$\text{Band} = f_u(d_{min}) - f_l(d_{min}) \qquad (20)$$

$$\text{Channel } BW = \frac{\Delta fi}{2} \qquad (21)$$

$$\text{where: } \Delta f_i = f_u(d_{i-1}) - f_u(d_{i+1}) \qquad (22)$$

$$\Delta d \approx \frac{\xi}{Q} \qquad (23)$$

A device using RMC communication may use a search mechanism (e.g., an exhaustive search mechanism).

A device using RMC communication may transmit a beacon sequence or a discovery signal(s) to track characteristics of a RMC link. In examples, chirp sequences may be used for discovery as a beacon and discovery sequences in RMC communication. Chirp signals (e.g., sweep signals) may be characterized by an increase (e.g., up-chirp) or decrease (e.g., down-chirp) of a carrier frequency with time.

If a waveform is:

$$\hat{x}(t) = \sin(\varphi(t)), \qquad (24)$$

the frequency (e.g., instantaneous frequency) may be the phase rate:

$$f(t) = \frac{1}{2\pi} d\varphi(t)/dt, \qquad (25)$$

and the chirpiness (e.g., instantaneous chirpiness) may be the frequency rate:

$$c(t) = \frac{1}{2\pi} d^2\varphi(t)/dt^2 = df(t)/dt. \qquad (26)$$

In a linear chirp, an instantaneous frequency f(t) may vary (e.g., linearly or exactly linearly) with time. In an exponential chirp, the frequency of the signal may vary, e.g., with a geometric relationship over time.

Chirp modulation may be based on the chirp rate. For example, chirp modulation may be based on the rate at which the frequency changes over time. In binary chirp modulation, digital data may be transmitted by mapping bits into chirps of opposite chirp rates.

A chirp signal may be generated via voltage-controlled oscillator (VCO) or via digital signal processing (DSP). For example, a chirp signal may be generated with a linearly or an exponentially driven VCO or via DSP.

A chirp sequence may be transmitted instead of or in addition to the pseudo-random sequences during discovery described herein. The sequence may start at a start frequency (e.g., $f_{min}$) and may sweep through an end frequency (e.g., $f_{max}$). The sequence may stop at a (e.g., each) raster frequency for a period of time (e.g., a sufficient period of time), e.g., to hear a potential response at that frequency.

In examples, the devices may be close (e.g., very close) to each other at $D_{min}$. The frequency sweep may start at a frequency (e.g., $f_{min}$), where a beacon response (e.g., a first beacon response) may be heard. The sweep may continue at a prespecified rate and end at a frequency (e.g., $f_{max}$), where a beacon response (e.g., a second response) may be heard. The two responses (e.g., the first and the second beacon responses) heard at the $f_{min}$ and the $f_{max}$ may report different coefficient of efficiency, such as the device-to-device coupling coefficient $K_{A,B}$, e.g., due to the physical inducement of channel parameters. The device may select the frequency that meets the requirements (e.g., better meets the requirements). For example, the device may select the frequency that is above (e.g., above or equal to/greater than) a threshold value, e.g., a preconfigured threshold value used as an example herein.

In examples, the devices may be at a distance d' to each other. The search mechanism may be performed. The frequency sweep may start (e.g., start again) at the frequency $f_{min}$ and may proceed to (e.g., eventually reaching) a frequency $f_1$, where the first response may be heard. The second response may be received at a frequency $f_2$. The device may choose (e.g., simultaneously choose) a frequency that meets the requirements (e.g., better meets the requirements). For example, the device may select a frequency that is above (e.g., equal to or above) a preconfigured threshold value.

In examples, the devices (e.g., the first device and the second device) may be at distance $d_{crit}$ to each other. The frequency sweep may report a frequency $f_{crit}$. The frequency $f_{crit}$ may be an option (e.g., the sole option) available for beacon signaling in the RM communication framework.

In examples, a CW signal may be used for a RMC communication beaconing mechanism. A CW or a sinusoidal carrier of constant amplitude and frequency may serve as a beacon. Information may be transmitted by switching a carrier on and off with varying duration, such as amplitude-shift keying (ASK), OOK, etc.

A device transitioning from a floated state (e.g., sleep mode) may start a discovery mechanism. A device may start the discovery mechanism by listening to the last known RMC channel. If the device does not hear a beacon, the device may move to adjacent channels, e.g., in order to account for small variations in the RM channel characteristics. The variations in the RM channel characteristics may occur due to mobility, orientation, or proximity to new devices. The device may initiate frequency sweep (e.g., the full frequency sweep described herein) to discover a beacon.

A device using RMC communication may perform a random scanning mechanism.

Main access points may not exist, e.g., similarly to ad hoc networks. If there are no main access points, a peer device (e.g., one of the peer devices) may assume the responsibility for sending a beacon. A beacon frame may be transmitted on a randomly chosen raster frequency with a probability of finding a pairing device.

The device (e.g., the first device) may listen to randomly chosen (e.g., pseudo-randomly chosen) raster frequency for a beacon. If the beacon is not received after a prespecified period, the device may switch to the next random frequency out of a reduced set of (N−1) possible channels. N may be the total number of raster frequencies in the RMC band. The device may repeat until a beacon is heard or N=1 (e.g., last available channel). If the beacon is heard/received, the device may trigger link establishment and adaptation mechanism. If the beacon is not heard, the device may trigger a state transition to interrogation mode (e.g., active mode) or the device may trigger a state transition to the floated state (e.g., sleep mode).

If a beacon is heard/received, the device may proceed with link establishment and adaptation mechanisms described herein.

A number of raster frequencies with the set N may carry high probability weight (e.g., higher probability weights) based on predetermined criteria and/or historical data. The likelihood of the channels being randomly selected may be high (e.g., higher than the remaining elements of the set).

An exemplary discovery mechanism for a RMC link between a device and a neighboring device (e.g., a first and a second devices), e.g., using RMC communication, may use one or more of beacons or sequence types and/or mechanisms as described herein. A device may bounce from active mode to passive mode (e.g., listener/reflector mode) as described herein.

Actions associated with a device bouncing from listener mode to interrogator mode (e.g., ping-pong effect) may be described. Harvested energy of the device may exceed a preconfigured threshold level. If the harvested energy of the device exceeds the preconfigured threshold level, the device may go into the interrogator mode (e.g., active mode). The device may go into backscattering mode (e.g., listener mode and/or passive mode). After a pre-defined period, the device may switch to active mode. The device transmit a wideband signal (e.g., interrogator mode). The device may detect a reflected signal from a backscattering device. The device may perform a fast Fourier transform (FFT) on the received backscatter and may find coarse frequency peaks. The device may transmit narrowband signals at the frequency peaks (e.g., the found coarse frequency peaks). The device may find upper and lower frequency peaks. The device may select a channel (e.g., the best channel) center frequency. The device may switch to reflector mode (e.g., from interrogator to backscatter mode).

Figure 14:
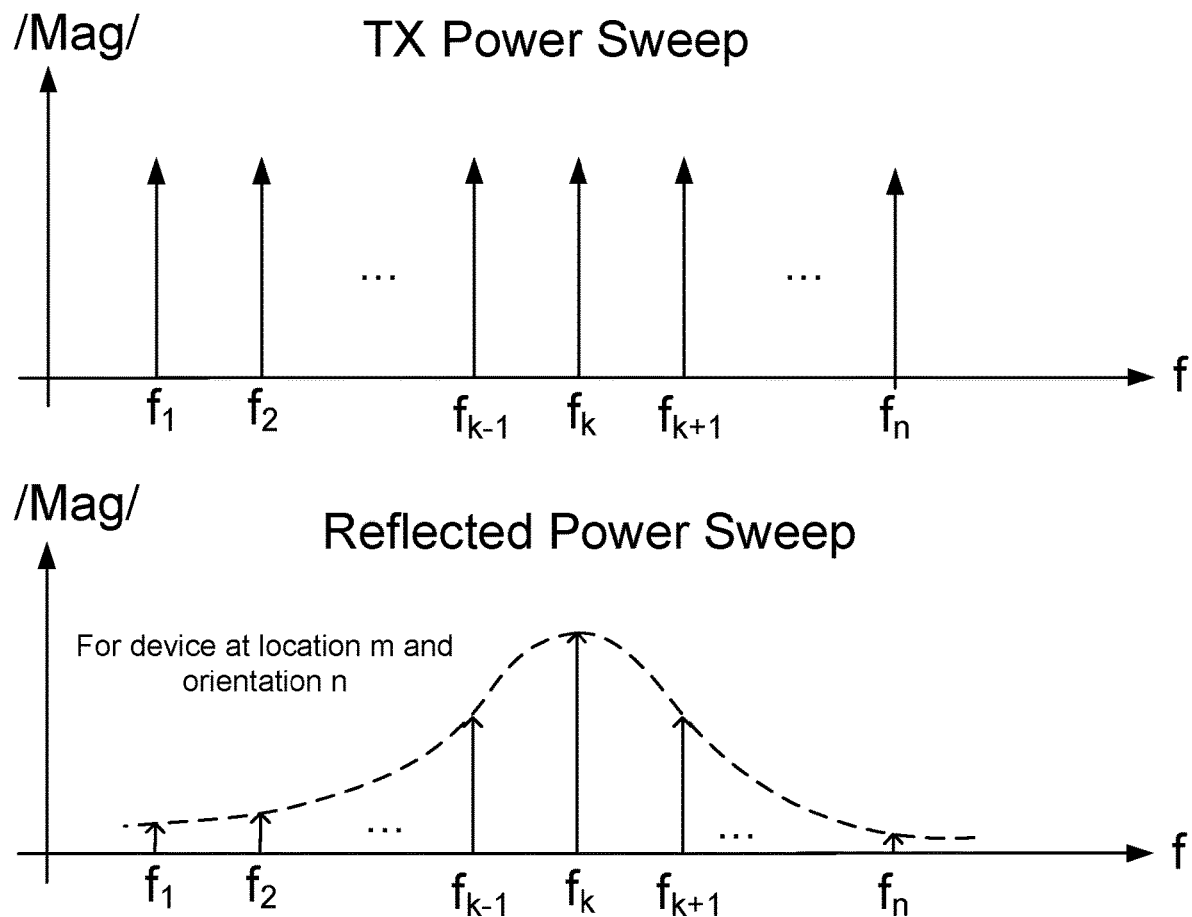
FIG. 14 illustrates an example of transmitted and reflected power sweep.

FIG. 14 illustrates an example of transmitted and reflected power sweep, e.g., from actions associated with Device A (e.g., a first device such as a transmitting device) and Device B (e.g., a second device such as a neighboring device), respectively. For example, the transmitted power sweep (e.g., as shown in FIG. 14) may be from the actions associated with Device A, and the reflected power sweep (e.g., as shown in FIG. 14) may be from the actions associated with Device B.

A link establishment and an adaptation mechanism may be described. The discovery mechanism (e.g., the initial discovery mechanism) may be performed (e.g., as shown in one or more of FIGS. 10A, 11, and/or 16). For example, as shown in FIGS. 10A, 11, and/or 16, a channel may be selected for a given inter-device distance and orientation. If the initial discovery mechanism has been completed, the devices (e.g., the first device and the second devices) may establish, optimize, and maintain a communication link. As described herein and shown in one or more of FIGS. 10A, 11, and/or 16, adaptive frequency tuning and inter-coil coupling optimization may achieve a desirable link quality (e.g., a more desirable link quality).

For example, the device, such as the first device, may be discovered and may enter active mode. The first device may connect to the other device (e.g., the second device that is a neighboring device to the first device) and may complete mechanisms to establish a link.

While in a connected state, the first device may monitor the link quality. For example, the first device may monitor one or more link parameters to assess the link quality. If the link quality fall below a threshold prespecified threshold, such as a quality threshold, a link adaptation mechanism may be initiated. If the link quality remains below the prespecified threshold, such as the quality threshold, the first device may re-initiate (e.g., repeat) the discovery mechanism described herein.

For near-field and mid-field wireless power systems, efficiency may decline (e.g., decline sharply) with range.

As shown in one or more of FIGS. 10A, 11, and/or 16, a first device may trigger a link establishment mechanism described herein by determining a parameter, such as a unique device ID, and an associated sub-band within the considered communication band from the device discovery mechanism described herein. The first device may use the parameter, such as the unique ID, to determine a channel (e.g., a suitable channel) within the identified sub-band that may meet a preconfigured minimum control channel quality requirements (e.g., a quality threshold). For example, if the interrogating device A (e.g., the first device) gets a response from a proximate device B (e.g., the second device), e.g., via the discovery mechanism, the backscattered signal from the device B may encode a unique ID. Device A (e.g., the first device) may adaptively improve the established link quality, e.g., by tuning internal coupling coefficients. Device A may address Device B (e.g., directly using the unique ID) and fine tune the link quality, e.g., by making adjustments to the internal coupling coefficients and measure improvements in SNR from subsequently transmitted/reflected signals.

An over-coupled system may have frequency splitting. For example, two magnetically coupled LCR tanks may be used. The two tanks may form a system and may oscillate in two modes. For example, the two LCR tanks may oscillate in a high frequency and a low frequency (e.g., a higher frequency and a lower frequency than the frequency, such as fundamental frequency) of an individual tank. The frequency separation of the two modes may be dependent on the coupling of the resonating circuits. As the coupling decreases, the degree of frequency separation (e.g., frequency splitting) may decrease, e.g., until the two modes converge to a frequency (e.g., fundamental frequency) of a single tank. FIG. 13 illustrates an example of frequency splitting versus distance. Two modes converging to a frequency of a tank (e.g., a single tank) may indicate that when driving coupled resonators, more than one mode or tuned frequency may exist.

Frequency may be adaptively tuned. In examples, a device, such as the first device, using RMC communication may measure an incident and reflected signal power upon transmission and may tune the frequency according to the determined resonant peaks.

Using a directional coupler between an output amplifier and a drive loop, the transmit system may measure (e.g., continuously measure) the incident and/or the reflected power, e.g., as a function of frequency. The transmit system may form a transmission line. The power not consumed by a load or lost to a parasitic resistance may be reflected to a source (e.g., since the transmit system may form a transmission line).

If frequency tuning is enabled, a controller may pick a resonant peak (e.g., the maximum resonant peak) and may track the resonant peak (e.g., the maximum resonant peak) with a frequency tuning loop, such as an automatic frequency tuning loop, as the receiver is moved away from the transmitter. As the distance (e.g., distance between the receiver and the transmitter) increases, the efficiency may decrease (e.g., decrease slowly) up to the coupling point (e.g., the critical coupling point). The coupling point (e.g., the critical coupling point) may be a point where the two modes merge, and the system may return to the under coupled regime. Frequency splitting may be a function of the coil to coil coupling coefficient $k_{AB}$.

Figure 15:
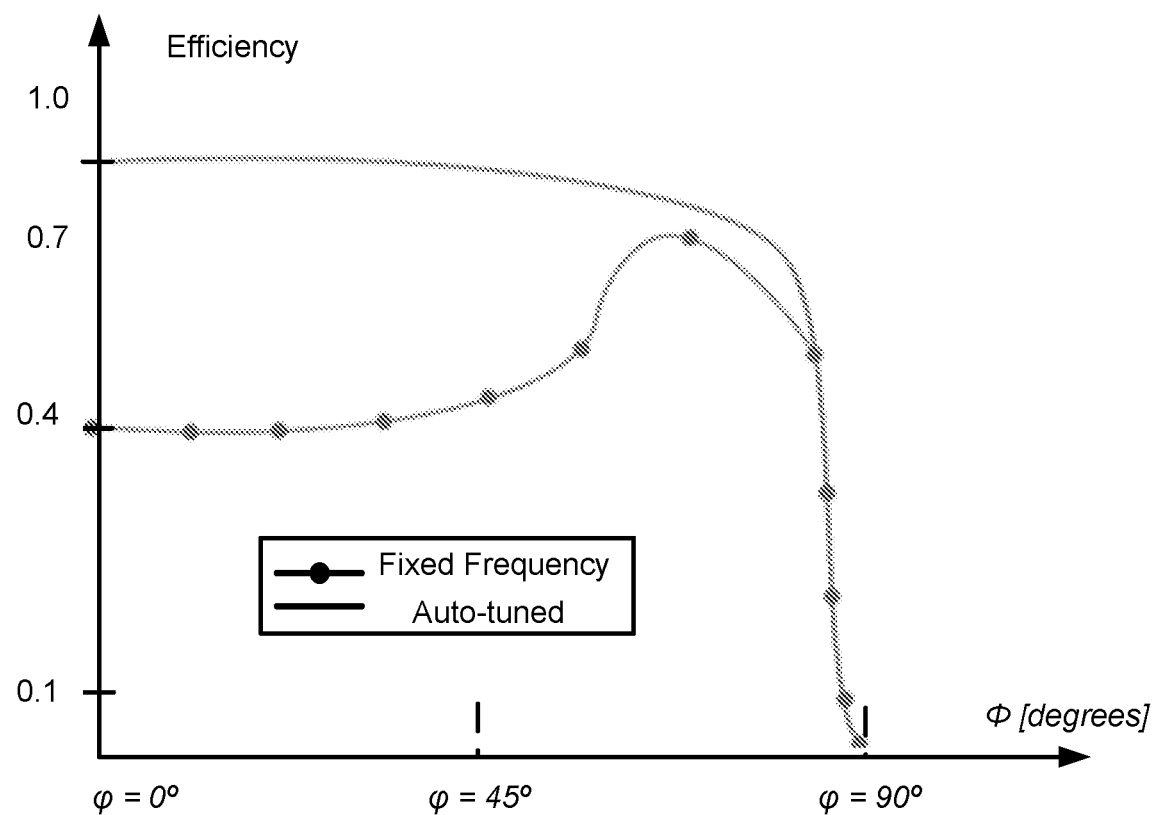
FIG. 15 illustrates an example of coupling efficiency between devices for a fixed frequency and an auto-tuned frequency.

The coupling may vary with orientation as shown in FIG. 15. FIG. 15 illustrates an example coupling efficiency as a function of angle between devices for a fixed frequency (e.g., a dotted line shown in FIG. 15) and an auto-tuned frequency (e.g., an undotted line shown in FIG. 15). An angle of 90 degrees may correspond to the devices being perpendicular (e.g., to each other). The distance between devices may remain constant as the angle varies from 0 to 90 degrees. If the receiver is close (e.g., sufficiently close) to the transmitter, an orientation and/or a position (e.g., almost any orientation and/or position) may cause some amount of mutual inductance between the two coils. If the mutual inductance results in enough coupling (e.g., $k_{AB} > k_{crit}$), frequency tuning (e.g., automatic frequency tuning) may be used to find the frequency that results in transfer efficiency (e.g., the highest possible transfer efficiency).

A device, such as a first device, using RMC communication may track the characteristics of the RMC link to another device (e.g., a second device). Resonant peaks may be determined and adaptation of the transmission side signal transmissions may be performed.

In examples, a device (e.g., a first device) detecting a link establishment and adaptation trigger from the device discovery mechanism may use the detected device identifier (e.g., that is associated with a second device) and associated sub-band for fine tuning the carrier frequency as part of link establishment and adaptation (e.g., as shown in one or more of FIGS. 10A, 11, and/or 16). The device, such as the first device, may split/bisect the sub-band associated with the discovered device into two other sub-bands, e.g., of equal bandwidth. The device may transmit (e.g., sequentially transmit) a spread spectrum sequence (e.g., determined based on the discovered unique identifier) over each of the split sub-bands (e.g., the bisected sub-bands). As shown in one or more of FIGS. 10A, 11, and/or 16, the first device may adjust the loop-to-coil coupling coefficient, e.g., for efficient transmission over the channel. The first device may receive and/or listen to a response, e.g., in the form of a reflected signal from the second device. The intended device (e.g., the second device) may respond to the transmitted sequence (e.g., uniquely transmitted sequence). The first device may determine the SNR value associated with that received/reflected signal (e.g., as shown in FIG. 16). The first device may determine the SNR value associated with the reflected signal (e.g., the highest SNR value associated with the reflected signal) in the sub-band and may repeat the mechanism described herein, e.g., until the bandwidth of a (e.g., each) sub-band is less than or equal a preconfigured value/threshold (e.g., as shown in FIG. 16). The first device may signal the selected carrier frequency and bandwidth to the listening device (e.g., the second device the), e.g., indicating to the listening device (e.g., the second device) the selected carrier frequency and/or bandwidth for the listening device to use, consider for use, etc. for further communications. The first device may trigger the adaptive impedance adjustment mechanism.

Adaptive impedance may be adjusted. In examples, a device (e.g., a first device) using RMC communication may determine characteristics of the RMC link to another device (e.g., a second device) and may adjust an impedance parameter, e.g., to maintain link quality (e.g., minimum link quality).

In examples, loop-to-coil coupling coefficients $K^A_{1,2}$ and $K^B_{1,2}$ may be considered as static design parameters to be optimized. In examples, the loop-to-coil coupling coefficients $K^A_{1,2}$ and $K^B_{1,2}$ may be considered as dynamically variable impedance matching coefficients enabling range adaptation, e.g., without frequency tuning. The loop-to-coil coupling may be adapted to compensate for a nonoptimal $k_{AB}$ (e.g., for an example of adapting to varying range and orientation).

If the RM system is running in the over-coupled range, where the devices are close (e.g., very close) and ($k_{AB} > k_{crit}$) at an off-resonance frequency $f_0$, little to no power may be transferred. Link efficiency may be brought back to a maximum. For example, to bring the link efficiency back to a maximum, the loop-to-coil coupling coefficients $K^A_{1,2}$ and $K^B_{1,2}$ may be decreased. The parameter Lit shown in equation 15 may be decreased. For example, the parameter Lit may be deceased until the parameter Lit is close to (e.g., equal to) the coupling coefficient (e.g., $k_{AB} = k_{crit}$). If the coupling coefficient is equal to the parameter $k_{crit}$ (e.g., $k_{AB} = k_{crit}$), a maximum power transfer may be resumed. The loop-to-coil coupling coefficients $K^A_{1,2}$ and $K^B_{1,2}$ adaptation mechanism described herein may allow an operation at a frequency, such as a single frequency $f_0$ (e.g., which may present an advantage for a band-limited operation).

Electronically controllable mechanisms for the loop-to-coil coupling coefficients $K^A_{1,2}$ and $K^B_{1,2}$ tuning may be developed. The RM communication system loops may be replaced by discrete and electronically variable matching networks allowing for automatic loop-to-coil coupling coefficients $K^A_{1,2}$ and $K^B_{1,2}$ tuning.

In examples, a device detecting adaptive impedance adjustment trigger from the link establishment and adaptation mechanism may use the parameter, such as the detected device identifier, associated carrier frequency $f_c$, and defined bandwidth $B_{imp}$, e.g., to optimize the link with a device. The device may use a loop-to-coil coupling coefficient to transmit a sequence (e.g., a unique sequence), determined based on the targeted device identifier (e.g., unique identifier), and of bandwidth $B_{imp}$ for a preconfigured period of time $T_{imp}$.

The mapping between the device identifier (e.g., the unique identifier) and transmitted sequence may be known to the devices (e.g., both devices). The device may receive and/or listen to a response (e.g., in the form of a reflected signal) in one or more (e.g., every) period $T_{inst}$ that is a fraction of the period $T_{imp}$. The device may determine the SNR of the associated signal. The device may signal the index of the time instance where the device received the SNR of the reflected signal (e.g., the highest SNR of the reflected signal) to the listening/discovered device. The device may repeat the mechanism described herein until the detected SNR (e.g., the highest/strongest detected SNR) is less than or equal to that of the detected SNR value (e.g., the previous SNR value of the impedance adjustment mechanism). In examples, the device may repeat transmitting the sequence as described herein. In examples, the device may repeat receiving/listening to the response and/or determining the SNR. In examples, the device may repeat signaling the index of time as described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A device comprising circuitry including a wireless transmitter, a wireless receiver, and a processor, the circuitry being configured to:
   transmit spread spectrum signals in a band and to receive responses thereto in the band from a wireless transmit/receive unit (WTRU), the responses including signals reflected from the WTRU;
   determine a first signal-to-noise ratio (SNR) of a first response from the WTRU;
   on a condition that the first SNR is below a threshold, transmit spread spectrum signals in a first sub-band and a second sub-band of the band;
   determine a second SNR of a second response from the WTRU in the first sub-band or the second sub-band; and
   on a condition that the second SNR is above the threshold:
      determine a parameter associated with the WTRU based on the second response,
      determine a first channel in the first sub-band or a second channel in the second sub-band based on the parameter, and
      cause a link to be established with the WTRU using at least one of the first channel or the second channel.

2. The device of claim 1, wherein the circuitry is configured to, on a condition that the second SNR is below the threshold:
   transmit spread spectrum signals in a third sub-band, a fourth sub-band, a fifth sub-band, and a sixth sub-band, the first sub-band comprising the third and fourth sub-bands and the second sub-band comprising the fifth and sixth sub-bands; and
   receive a third response in at least one of the third sub-band, the fourth sub-band, the fifth sub-band, or the sixth sub-band.

3. The device of claim 1, wherein the parameter comprises one or more of an ID, a first loop-to-coil coupling coefficient, a second loop-to-coil coupling coefficient, a frequency in at least one of the first channel or the second channel, or a gain.

4. The device of claim 1, wherein the circuitry is configured to:
   determine a quality information associated with the link;
   on a condition that the quality information is below a quality threshold, adjust at least one of the first channel or the second channel or adjust one or more of a first loop-to-coil coupling coefficient or a second loop-to-coil coupling coefficient; and
   on a condition that the quality information is above the quality threshold, continue to monitor the link.

5. The device of claim 1, wherein a power level of a first spread spectrum signal transmitted in the band is equal to a power level of a second spread spectrum signal transmitted in the first sub-band or the second sub-band.

6. The device of claim 1, wherein the circuitry is configured to:
   on a condition that the first SNR is above the threshold:
      determine the parameter based on the first response;
      determine a third channel in the band based on the parameter; and
      cause a link to be established with the WTRU using the third channel.

7. The device of claim 1, wherein the circuitry comprises resonance magnetic coupling circuitry.

8. The device of claim 1, wherein the circuitry is configured to cause a message to be transmitted to the WTRU indicating that the link has been established.

9. A method comprising:
   transmitting spread spectrum signals in a band and receiving responses thereto from a wireless transmit/receive unit (WTRU), the responses including signals reflected from the WTRU;
   determining a first signal-to-noise ratio (SNR) of a first response from the WTRU;
   on a condition that the first SNR is below a threshold, transmitting spread spectrum signals in a first sub-band and a second sub-band of the band;
   determining a second SNR of a second response from the WTRU in the first sub-band or the second sub-band; and
   on a condition that the second SNR is above the threshold:
      determining a parameter associated with the WTRU based on the second response,
      determining a first channel in the first sub-band or a second channel in the second sub-band based on the parameter, and
      establishing a link with the WTRU using at least one of the first channel or the second channel.

10. The method of claim 9, wherein on a condition that the second SNR is below the threshold, comprising:
    transmitting spread spectrum signals in a third sub-band, a fourth sub-band, a fifth sub-band, and a sixth sub-band, the first sub-band comprising the third and fourth sub-bands and the second sub-band comprising the fifth and sixth sub-bands; and receiving a third response in at least one of the third sub-band, the fourth sub-band, the fifth sub-band, or the sixth sub-band.

11. The method of claim 9, wherein the parameter comprises one or more of an ID, a first loop-to-coil coupling coefficient, a second loop-to-coil coupling coefficient, a frequency in at least one of the first channel or the second channel, or a gain.

12. The method of claim 9, wherein the method comprises:
determining a quality information associated with the link;
on a condition that the quality information is below a quality threshold, adjusting at least one of the first channel or the second channel or adjusting one or more of a first loop-to-coil coupling coefficient or a second loop-to-coil coupling coefficient; and
on a condition that the quality information is above the quality threshold, continuing to monitor the link.

13. The method of claim 9, wherein the method comprises:
on condition that the first SNR is above the threshold:
determining the parameter based on the first response;
determining a third channel in the band based on the parameter; and
establishing a link with the WTRU using the third channel.

14. The method of claim 9, wherein the transmitting and receiving are performed using resonance magnetic coupling.

15. The method of claim 9, wherein the method comprises transmitting a message to the WTRU indicating that the link has been established.

16. The method of claim 9, wherein a power level of a first spread spectrum signal transmitted in the band is equal to a power level of a second spread spectrum signal transmitted in the first sub-band or the second sub-band.

* * * * *